(12) United States Patent
Eltantawy et al.

(10) Patent No.: US 11,768,715 B1
(45) Date of Patent: Sep. 26, 2023

(54) THREAD SCHEDULING ON SIMT ARCHITECTURES WITH BUSY-WAIT SYNCHRONIZATION

(71) Applicant: Stephen Melvin, Vancouver (CA)

(72) Inventors: Ahmed Eltantawy, Vancouver (CA); Tor Aamodt, Vancouver (CA)

(*) Notice: Subject to any disclaimer, the term of this patent is extended or adjusted under 35 U.S.C. 154(b) by 537 days.

(21) Appl. No.: 17/003,695

(22) Filed: Aug. 26, 2020

Related U.S. Application Data

(63) Continuation of application No. PCT/US2019/019588, filed on Feb. 26, 2019.

(60) Provisional application No. 62/635,052, filed on Feb. 26, 2018.

(51) Int. Cl.
*G06F 9/52* (2006.01)
*G06F 9/38* (2018.01)
*G06F 9/48* (2006.01)

(52) U.S. Cl.
CPC ............ *G06F 9/524* (2013.01); *G06F 9/3842* (2013.01); *G06F 9/3887* (2013.01); *G06F 9/4881* (2013.01)

(58) Field of Classification Search
CPC ...... G06F 9/524; G06F 9/3842; G06F 9/3887; G06F 9/4881
See application file for complete search history.

(56) References Cited

U.S. PATENT DOCUMENTS

| | | | |
|---|---|---|---|
| 7,594,234 B1* | 9/2009 | Dice | G06F 9/526 718/100 |
| 2018/0121255 A1* | 5/2018 | Heidinga | G06F 9/526 |

* cited by examiner

*Primary Examiner* — Wissam Rashid
(74) *Attorney, Agent, or Firm* — Stephen W. Melvin

(57) ABSTRACT

A system and method that detects that a group of threads has executed a spin-inducing branch in a single-instruction multithreaded processor and scheduling groups of threads based on the detection, marking the group as backed-off and deprioritizing the group for scheduling. When the group is scheduled a back-off counter is initialized and decremented each clock cycle. The group of threads is prevented from being scheduled if the spin-inducing branch is executed again before the counter reaches zero. A hardware system and method for labeling spin-inducing branches that determines that a profiled thread is in a spinning state and detects that a backward branch is executed while spinning. The detection is based on executions of a loop where the operand values for the exit condition don't change. A confidence level can be used that increases with each execution of a backward branch while in the spinning state.

18 Claims, 13 Drawing Sheets

```
A: *mutex = 0
B: while(!atomicCAS(mutex,0,1));
C: // critical section
   atomicExch(mutex,0);
```

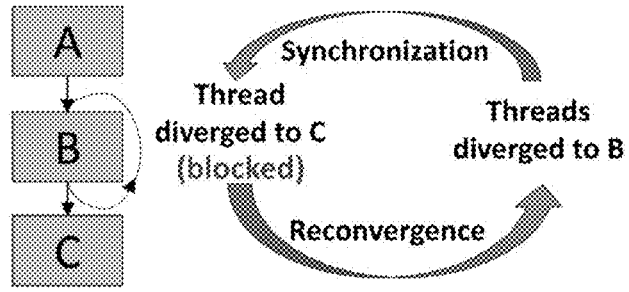

Fig. 1

```
5.     unsigned int key = keys[tid];
6.     size_t hashValue = hash( key, table.count );
7.     Entry *location = &(table.pool[tid]);
8.     location->key = key;
9.     location->value = values[tid];
10.    bool done = false;
11.    while(!done){
12.      if(atomicCAS(lock[hashValue].mutex, 0, 1) == 0 ){
13.        __threadfence();
14.        location->next = table.entries[hashValue];
15.        table.entries[hashValue] = location;
16.        done = true;
17.        __threadfence();
18.        atomicExch(lock[hashValue].mutex,0);
19.      }
20.    }
```

Fig. 2

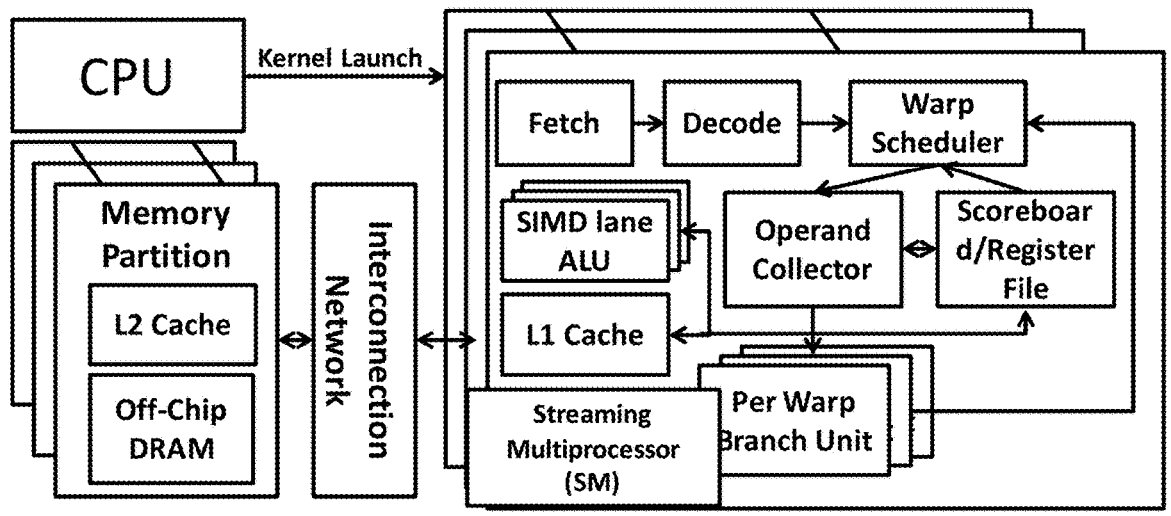
Fig. 7
```
1.  // id = thread ID
2.  // BB_A Basic Block "A"
3.  if (id%2==0){
4.      // BB_B
5.  } else {
6.      // BB_C
7.  }
8.  // BB_D
```
Fig. 9
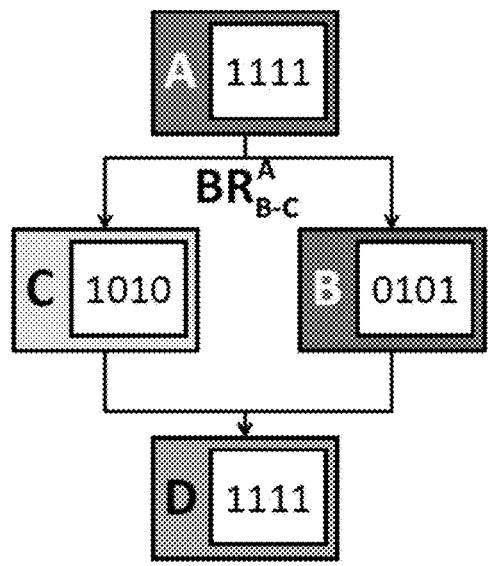
Fig. 10

```
1. clock_t start = clock();
2. clock_t now;
3. for(;;) {
4.   now = clock();
5.   clock_t cycles = now>start? now-start :
        now +(0xffffffff-start);
6.   if(cycles >= DELAY_FACTOR*blockIdx.x){
7.     break;
8.   }
9. }
```

```
for each Execution Window of T cycles:
    if(SIB Instructions > FRAC1 * Total Instructions)
        Delay Limit += Delay Step
    if((Total Instructions)/(SIB Instructions)<
       FRAC2 * (Prev. Total Instructions)/(Prev. SIB Instructions))
        Delay Limit -= 2*Delay Step if(Delay Limit > Max Limit) Delay Limit = Max Limit
    if(Delay Limit < Min Limit) Delay Limit = Min Limit

-----------------------------------------------------------------

Values used in Evaluation:
T=1000 cycles, FRAC1=0.05, FRAC2=0.8,
Delay Step=250 cycles, Max Limit = 10000 cycles,
Min Limit = 1000 cycles
```

Fig. 15

```
1.  bool transaction_done = false;
2.  while(!transaction_done) {
       // try lock 1
3.     if( atomicCAS( &lock1->lock, 0, 1 ) == 0 ){
       // try lock 2
4.        if(atomicCAS( &lock2->lock, 0, 1 ) == 0 ){
5.           // critical section
6.           atomicExch(&lock2->lock,0); // release lock 2
7.           atomicExch(&lock1->lock,0); // release lock 1
8.           transaction_done = true;
9.        }else {
10.          atomicExch(&lock1->lock,0); // release lock 1
11.       }
12.    }
13. }
```

Fig. 16

```
1.  for(i = 0; i < 32; i++) {
       // serialize threads within the same warp
2.     if(lane_id == i) {
       // try global lock
3.        while(atomicCAS( mutex, 0, 1 ) != 0 ){
4.        }
5.        // critical section
6.        atomicExch( mutex, 0);
7.     }
8.  }
```

Fig. 17

```
1.  ....
2.  while (k >= bottom) {
3.     start = startd[k];
4.     if (start >= 0) { // if not wait
5.        ....
6.        if (ch >= nbodiesd) {
7.           ...
8.        }else {
9.           // child is a body
10.          sortd[start] = ch; //signal
11.       }
12.       k -= dec; // move to next cell
13.    }
14. }
```

Fig. 18

```
0x028:  mov.s16 %r21, 0;
        BB2:
0x030:  atom.cas.b32 %r15, [%r129], 0, 1;
0x038:  setp.eq.s32 %p2, %r15, 0;
0x040:  @%p2 bra BB3;
0x048:  bra.uni BB4;
        BB3:
        // critical section
0x088:  mov.s16 %r21, 1
        BB4:
0x090:  setp.eq.s16 %p3, %r21, 0;
0x098:  @%p3 bra BB2;
```

Fig. 19

```
0x020:  ld.param.u32 %r15,
        [_Z14invert_mappingPfS_ii_param_3];
0x028:  mov.u32 %r20, 0;
        BB2:
0x030:  ld.global.f32 %f1, [%r114];
0x038:  st.global.f32 [%r115], %f1;
0x040:  add.s64 %r115, %r115, %r14;
0x048:  add.s64 %r114, %r114, 4;
0x050:  add.s32 %r20, %r20, 1;
0x058:  setp.lt.s32 %p4, %r20, %r15;
0x060:  @%p4 bra BB2;
```

THREAD SCHEDULING ON SIMT ARCHITECTURES WITH BUSY-WAIT SYNCHRONIZATION

RELATED APPLICATIONS

This application is a continuation of PCT Application No. PCT/US19/19588, filed on Feb. 26, 2019, and claims priority to U.S. Provisional Application No. 62/635,052, filed on Feb. 26, 2018, both of which are incorporated herein by reference.

SUMMARY

Single-Instruction Multiple-Threads (SIMT) architectures have seen widespread interest in accelerating data parallel applications. In the SIMT model, small groups of scalar threads operate in lockstep. Within each group, current SIMT implementations serialize the execution of threads that follow different paths, and to ensure efficiency, revert to lockstep execution as soon as possible. These thread scheduling constraints may cause a deadlock-free program on a multiple-instruction multiple-data architecture to deadlock on a SIMT machine. Further, fine-grained synchronization is often implemented using busy-wait loops. However, busy-wait synchronization incurs significant overheads and existing CPU solutions do not readily translate to SIMT architectures. Embodiments of the invention utilize a hardware warp scheduling policy that may be informed by a novel hardware mechanism for accurately detecting busy-wait synchronization on GPUs. When employed, it deprioritizes spinning warps achieving a speedup of 42.7% over Greedy Then Oldest scheduling.

BRIEF DESCRIPTION OF THE DRAWINGS

FIG. 1 illustrates a typical MIMD implementation of a spin lock guarding a critical section;

FIG. 2 illustrates an implementation of a critical section in a hashtable implementation in CUDA;

FIG. 7 illustrates a baseline SIMT architecture;

FIG. 9 illustrates a divergent code example;

FIG. 10 illustrates a control flow graph of a divergent code example;

FIG. 15 illustrates adaptive backoff delay limit estimation;

FIG. 16 illustrates code for two nested locks;

FIG. 17 illustrates code for global locking;

FIG. 18 illustrates code for wait and signal;

FIG. 19 illustrates code for a busy wait loop;

FIG. 20 illustrates updates to history registers and prediction table;

FIG. 21 illustrates code for a regular loop;

FIG. 22 illustrates updates to history registers and prediction table;

DETAILED DESCRIPTION

Figure 3:
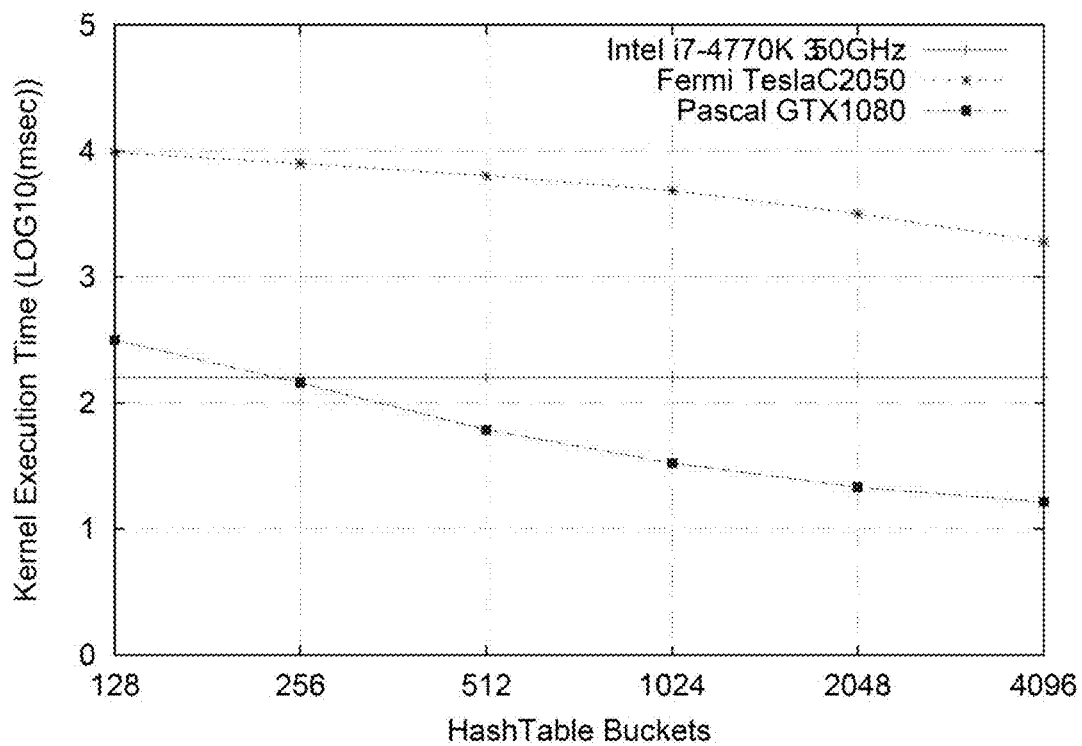
FIG. 3 illustrates a comparison of the execution time of hashtable code on a GPU versus on a CPU.

Over the last few decades, semiconductor process technology has been advancing according to Moore's Law, which states that the density of transistors on integrated circuits doubles about once every two years. This increase in the number of transistors has been utilized to improve the single thread performance in general purpose CPUs. However, CPUs have hit a major challenge known as the power wall (see for example S. Naffziger, J. Warnock, and H. Knapp, "When Processors Hit The Power Wall", *IEEE International Conference on Solid-State Circuits Conference (ISSCC)*, pages 16-17, 2005) which limits the increase in single thread performance. Therefore, computer architects have moved towards energy efficient parallel architectures. Massively multithreaded architectures, such as graphic processing units (GPUs), mitigate the power problem by running thousands of threads in parallel at lower frequencies, and amortizing the cost of fetching, decoding and scheduling instructions by executing them in a single instruction multiple data (SIMD) fashion.

These properties have motivated the computer industry to transform GPUs from merely fixed function accelerators for graphics into programmable compute accelerators. For such a transformation to happen, there was a need to develop adequate programming models for GPUs that allow non-graphics applications to utilize the computing power of GPUs without using graphics-oriented APIs. This led to the development of general purpose programming models for GPUs such as CUDA (see for example *NVIDIA CUDA Programming Guide*, NVIDIA Corporation, 2011) and OpenCL (see for example *OpenCL Programming Guide*, AMD Corporation, 2010). The resultant programming model is referred to as the Single Instruction Multiple Thread (SIMT) model. The SIMT model has seen widespread interest and similar models have been adopted in CPU architectures with wide-vector support (see for example *The ISPC Parallel Execution Model*, Intel Corporation).

Using such programming models, software developers have demonstrated that SIMT architectures have significant potential in cost-effective computing for data-parallel applications with regular control-flow and regular memory access patterns (see for example *GPU Applications Accelerated*, NVIDIA Corporation). However, it is quite challenging to obtain similar results on applications that have a significant portion of their instruction streams common across threads yet feature non-uniform control behavior, irregular memory access patterns, and/or inter-thread synchronization (see for example M. Burtscher, R. Nasre, and K. Pingali, "A Quantitative Study of Irregular Programs on GPUs," *IEEE Symposium on Workload Characterization (IISWC)*, 2012). This has motivated the computer architecture community to study modifications to the graphics-based SIMT architectures to allow for efficient acceleration of wider scope of general purpose applications (see for example A. Bakhoda, G. L. Yuan, W. W. Fung, H. Wong, and T. M. Aamodt, "Analyzing CUDA Workloads Using a Detailed GPU Simulator," *IEEE Symposium on Performance Analysis of Systems and Software (ISPASS)*, 2009, pp. 163-174; W. Fung, I. Sham, G. Yuan, and T. Aamodt. "Dynamic Warp Formation and Scheduling for Efficient GPU Control Flow," *IEEE/ACM*

Symposium on Microarchitecture (MICRO), pages 407-420, 2007; J. Meng, D. Tarjan, and K. Skadron, "Dynamic Warp Subdivision for Integrated Branch and Memory Divergence Tolerance," IEEE/ACM Symposium on Computer Architecture (ISCA), pages 235-246, 2010; V. Narasiman, M. Shebanow, C. J. Lee, R. Miftakhutdinov, O. Mutlu, and Y. N. Patt, "Improving GPU Performance via Large Warps and Two-Level Warp Scheduling," IEEE/ACM Symposium on Microarchitecture (MICRO), 2011, pp. 308-317; T. G. Rogers, M. O'Connor, and T. M. Aamodt, "Cache-Conscious Wavefront Scheduling," IEEE/ACM Symposium on Microarchitecture (MICRO), 2012, pp. 72-83); and T. G. Rogers, M. O'Connor, and T. M. Aamodt, "Divergence-Aware Warp Scheduling," IEEE/ACM Symposium on Microarchitecture (MICRO), 2013).

SIMT Execution Model Potential

Traditional Single Instructions Multiple Data (SIMD) architectures are hard to program. The underlying hardware provides little support for arbitrary memory access and control flow divergence (see for example T. Chen, R. Raghavan, J. Dale, and E. Iwata, "Cell Broadband Engine Architecture And Its First Implementation," IBM Corporation, 2005; and R. M. Russell, "The CRAY-1 Computer System," Communications of the ACM, 21(1):63-72, 1978). Thus, it is essential for the code running on such machines to be explicitly vectorized. The vectorization task is typically fully or partially performed by programmers (see for example Vector Technology, IBM Corporation). Compilers can perform automatic vectorization but they can fail on simple cases due to uncertainty about loop iterations' dependencies or non-uniform memory access stride (see for example Auto-Vectorization Limitations, IBM Corporation). Thus, traditional SIMD systems are either hard to program and/or limited in scope.

This has significantly changed with the introduction of the Single Instructions Multiple Threads (SIMT) architectures. In SIMT architectures, the hardware with minimal help from the compiler supports arbitrary memory accesses and control flow divergence. This abstracts away the complexity of the underlying SIMD hardware allowing for much simpler programming models. The single-instruction multiple-thread (SIMT) programming model was originally introduced and popularized for graphics processor units (GPUs) along with the introduction of CUDA (see for example NVIDIA CUDA Programming Guide, NVIDIA Corporation, 2011) but it has seen widespread interest and similar models have been adopted in CPU architectures with wide-vector support (see for example The ISPC Parallel Execution Model, Intel Corporation).

Arguably, a key reason for the success of this model is its abstraction of the underlying SIMD hardware. In SIMT-like execution models, scalar threads are combined into groups that execute in lockstep on single-instruction multiple-data (SIMD) units. These groups are called "warps" by NVIDIA, "wavefronts" by AMD and "gangs" by Intel. The SIMT programming model divides the burden of identifying parallelism differently than traditional approaches of vector machines. The programmer, who is armed with application knowledge, identifies far-flung outer-loop parallelism and specifies the required behavior of a single thread in the parallel region. The hardware implicitly handles control flow and memory divergence within threads of the same warp. Thus, with this abstraction, programmers can leverage the underlying SIMD hardware without having to deal with explicit vectorization.

However, current implementations for this desired abstraction are still far from perfect. In situations that involve inter-thread synchronization, the SIMD nature of the underlying hardware induces special types of deadlocks that would not happen otherwise. Further, recent SIMT implementations still suffer excessive performance overheads under non-uniform control behavior, irregular memory access patterns, and/or inter-thread synchronization. This negatively impacts the programmability of SIMT architectures on irregular applications as it forces programmers to be aware of the details of the SIMT implementation to write functionally correct and optimized code.

SIMT Model Interaction with Thread Synchronization

On current hardware the SIMT model is typically implemented via predication, or in the general case using stack-based masking of execution units (see for example Southern Islands Series Instruction Set Architecture, AMD Corporation, 2012; U.S. Pat. No. 8,381,203 to Beylin et al.; U.S. Pat. No. 7,353,369 to Coon et al.; The ISPC Parallel Execution Model, Intel Corporation; and A. Levinthal and T. Porter, "Chap—A SIMD Graphics Processor," ACM Conference on Computer Graphics and Interactive Technology (SIGGRAPH), 1984). This mechanism enables threads within the same warp to diverge (i.e., follow different control flow paths). To do this, the hardware forces divergent threads to serialize their execution and then restores SIMD utilization by forcing divergent threads to reconverge as soon as possible (typically at the immediate postdominator point of the divergent branch) (see also U.S. Pat. No. 9,424,099 to Houston et al.). This mechanism creates implicit scheduling constraints for divergent threads within a warp which leads to programmability implications. For example, when a GPU kernel code is written in such a way that the programmer intends divergent threads to communicate, these scheduling constraints can lead to surprising (from a programmer perspective) deadlock and/or livelock conditions. Thus, a multi-threaded program that is guaranteed to terminate on a MIMD machine may not terminate on machines with current SIMT implementations (see for example A. Habermaier and A. Knapp. "On the Correctness of the SIMT Execution Model of GPUs," Programming Languages and Systems, pages 316-335, Springer, 2012). The term "MIMD machine" is used herein to refer to any architecture that guarantees loose fairness in thread scheduling so that threads not waiting on a programmer synchronization condition make forward progress.

FIG. 1 shows a typical MIMD implementation of a spin lock guarding a critical section. On a SIMT machine, this code typically deadlocks. In particular, a thread that acquires the lock is indefinitely blocked at the loop exit waiting to reconverge with lagging threads from the same warp. However, lagging threads never exit the loop because they wait for the lock to be released by the leading thread. Similar scenarios occur with fine-grained synchronization. A case where the forward progress of a diverged thread is prevented due to the implicit SIMT scheduling constraints is referred to herein as SIMT-induced deadlock or just SIMT deadlock.

The possibility of SIMT-induced deadlocks is a challenge, given the increasing interest in using SIMT architectures for irregular applications (see for example M. Burtscher, R. Nasre, and K. Pingali, "A Quantitative Study of Irregular Programs on GPUs," IEEE Symposium on Workload Characterization (IISWC), 2012; T. H. Hetherington, T. G. Rogers, L. Hsu, M. O'Connor, and T. M. Aamodt, "MemcachedGPU: Scaling-up Scale-out Key-value Store," ACM Symposium on Cloud Computing (SoCC), pages 88-98, 2015; S. Hong, S. K. Kim, T. Oguntebi, and K. Olukotun, "Accelerating CUDA Graph Algorithms at Maximum Warp," ACM Symposium on Principles and Practice of

*Parallel Programming (PPoPP)*, pages 267-276, 2011; A. Li, G.-J. van den Braak, H. Corporaal, and A. Kumar, "Fine-grained Synchronizations and Dataflow Programming on GPUs," *ACM Conference on Supercomputing (ICS)*, 2015; M. Mendez-Lojo, M. Burtscher, and K. Pingali, "A GPU Implementation of Inclusion-based Points-to Analysis," *ACM Symposium on Principles and Practice of Parallel Programming (PPoPP)*, 2012; D. Merrill, M. Garland, and A. Grimshaw, "Scalable GPU Graph Traversal," *ACM Symposium on Principles and Practice of Parallel Programming (PPoPP)*, pages 117-128, 2012; N. Moscovici, N. Cohen, and E. Petrank, "POSTER: A GPU-Friendly Skiplist Algorithm," *ACM Symposium on Principles and Practice of Parallel Programming (PPoPP)*, 2017; and Y. Xu, L. Gao, R. Wang, Z. Luan, W. Wu, and D. Qian, "Lock-based Synchronization for GPU Architectures," *International Conference on Computing Frontiers*, 2016). Moreover, parallel algorithms developed for MIMD execution can serve as starting points for GPU kernel development provided SIMT deadlock can be avoided.

For complex applications writing functionally correct code can be challenging as programmers need to reason about how synchronization interacts with the SIMT implementation. Further, the code is vulnerable to compiler optimizations that may modify the control flow graph (CFG) assumed by programmers. SIMT deadlocks also present challenges to emerging OpenMP support for SIMT architectures and to the transparent vectorization of multithreaded code on SIMD CPU architectures (see for example S. Antao, C. Bertolli, A. Bokhanko, A. Eichenberger, H. Finkel, S. Ostanevich, E. Stotzer, and G. Zhang, *OpenMP Offload Infrastructure in LLVM*, LLVM Technical Report, 2015; C. Bertolli, S. F. Antao, A. E. Eichenberger, K. O'Brien, Z. Sura, A. C. Jacob, T. Chen, and O. Sallenave, "*Coordinating GPU Threads for OpenMP 4.0 in LLVM*," *LLVM Compiler Infrastructure in HPC*, 2014; S. Lee, S.-J. Min, and R. Eigenmann, "OpenMP to GPGPU: a Compiler Framework for Automatic Translation and Optimization," *ACM Symposium on Principles and Practice of Parallel Programming (PPoPP)*, pages 101-110, 2009; G. Noaje, C. Jaillet, and M. Krajecki, "Source-to-source Code Translator: OpenMP C to CUDA," *IEEE International Conference on High Performance Computing and Communications (HPCC)*, 2011; *OpenMP Clang Frontend Documentation*; and X. Tian and B. R. de Supins, "Explicit Vector Programming with OpenMP 4.0 SIMD Extension," *Primeur Magazine*, 2014).

Aside from these functional limitations imposed by current SIMT implementations, there are also performance implications. FIG. 2 illustrates a manual workaround for the SIMT deadlock problem shown in FIG. 1. In FIG. 2, the code is structured such that the atomicExch release statement (line 10) is contained within the spin loop to avoid SIMT-induced deadlocks. In this code threads that successfully acquire the lock are guaranteed to be able to make forward progress to the lock release code. This workaround handles a simple case where there is a single lock acquire statement with a single lock release statement that postdominates the lock acquire. Thus, the required code transformation is relatively simple to reason about using high level semantics provided the programmer is aware of the details of the reconvergence mechanism. This is, however, not necessarily true for more complex synchronization patterns. Now consider the performance implications of the SIMT model on this code even after SIMT deadlocks are avoided.

The code in FIG. 2 is an implementation of a critical section in a hashtable implementation in CUDA. Hashtables in GPUs are commonly used in key-value store applications, text mining, state space exploration, DNA alignment and others (see for example Y. Zhang, F. Mueller, X. Cui, and T. Potok, "GPU-accelerated Text Mining," *Workshop on Exploiting Parallelism using GPUs and other Hardware-Assisted Methods*, 2009; Y. Zhang, F. Mueller, X. Cui, and T. Potok, "Data-intensive Document Clustering on Graphics Processing Unit (GPU) Clusters," *Journal of Parallel and Distributed Computing*, 71(2):211-224, 2011; A. Wijs and D. Bosnacki, "Gpuexplore: Many-Core On-The-Fly State Space Exploration Using GPUs," *International Conference on Tools and Algorithms for the Construction and Analysis of Systems*, pages 233-247, Springer, 2014; K. Zhao and X. Chu, "G-BLASTN: Accelerating Nucleotide Alignment By Graphics Processors," *Bioinformatics*, 30(10):1384, 2014; and D. A. Alcantara, A. Sharf, F. Abbasinejad, S. Sengupta, M. Mitzenmacher, J. D. Owens, and N. Amenta, "Real-Time Parallel Hashing On The GPU," *ACM Transactions on Graphics (TOG)*, 28(5):154, 2009).

The implementation in FIG. 2 is an optimized version of NVIDIA's CUDA by Example (see J. Sanders and E. Kandrot, *CUDA By Example: An Introduction To General-Purpose GPU Programming*, Addison-Wesley Professional, 2010)

FIG. 3 illustrates a comparison of the execution time of 26.2 million insertions of random keys to this hashtable on a GPU versus on a CPU while varying the number of hashtable buckets. The smaller the number of the buckets, the larger the contention. FIG. 3 shows the execution time on two different generations of NVIDIA GPUs, a Tesla C2050 (Fermi), and GeForce GTX 1080 (Pascal), and an Intel Core i7 CPU running a serial CPU version of the same hashtable code. Both CPU and GPU versions are compiled with NVCC-6.5-03. The CPU version outperforms the older Tesla C2050 for all sizes considered while the GTX 1080 outperforms the CPU starting from 512 hashtable buckets. At 4096 buckets the GTX 1080 is 9.77 times faster than the serial CPU version.

Figure 4:
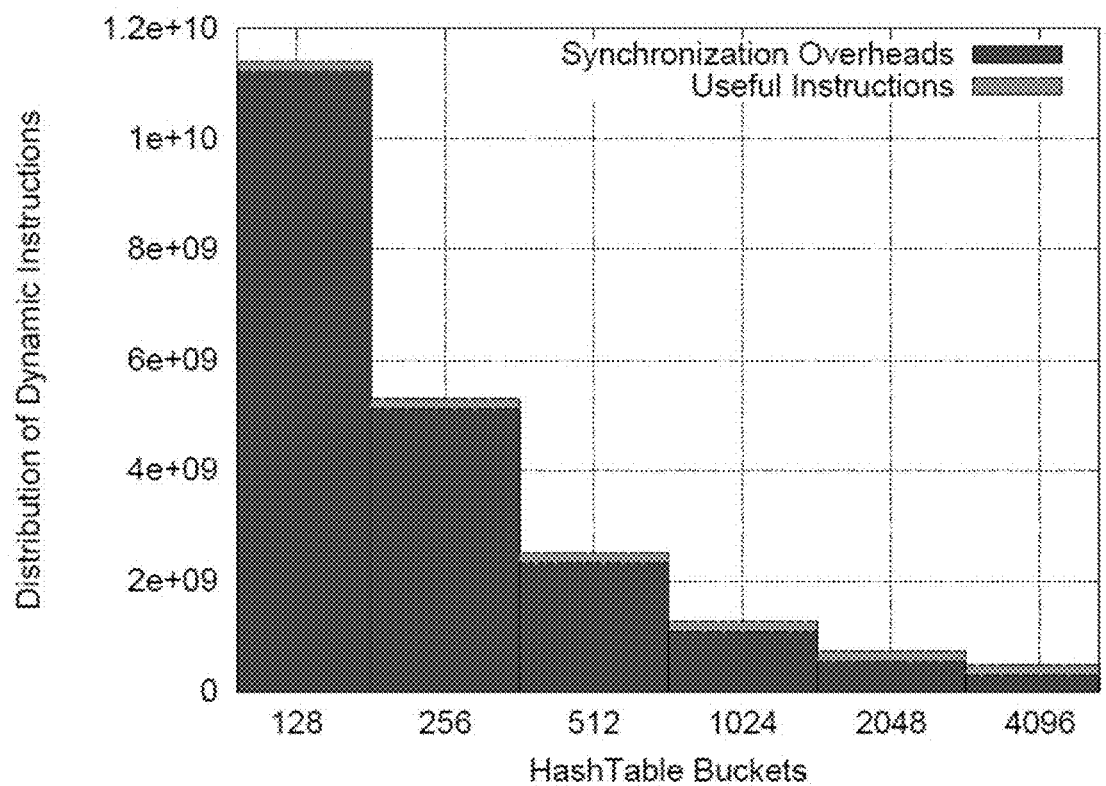
FIG. 4 illustrates dynamic instruction overheads as a function of number of hashtable buckets.
Figure 5:
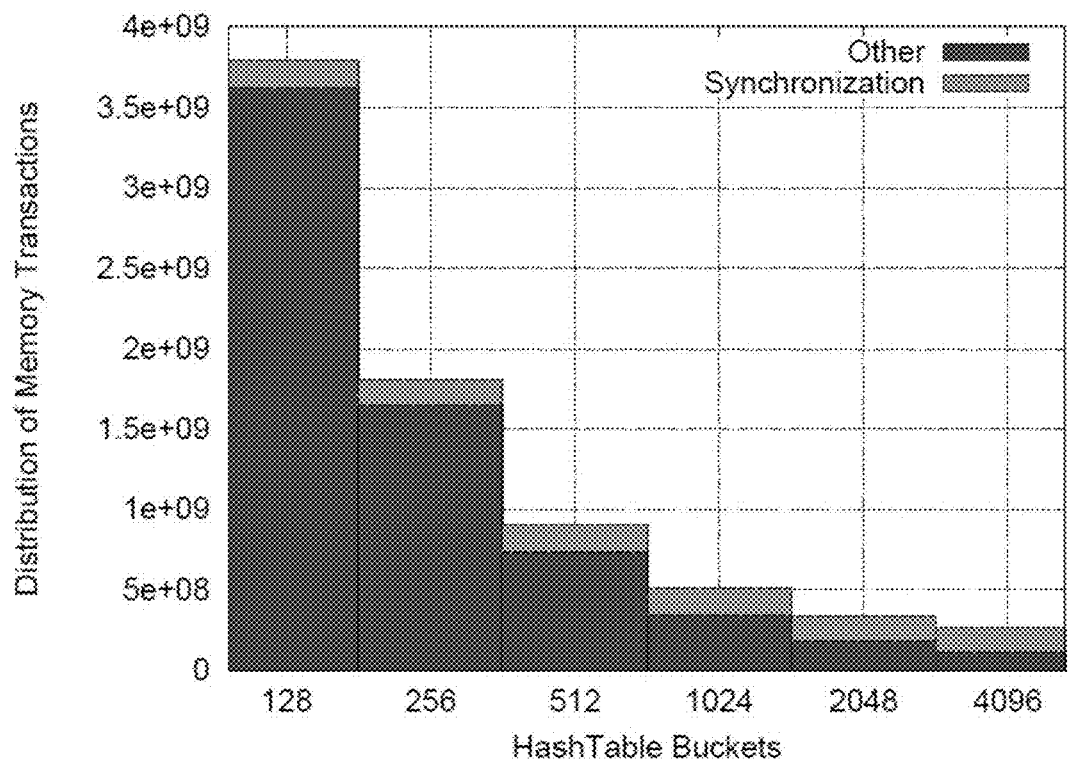
FIG. 5 illustrates memory traffic overheads as a function of number of hashtable buckets.
Figure 6:
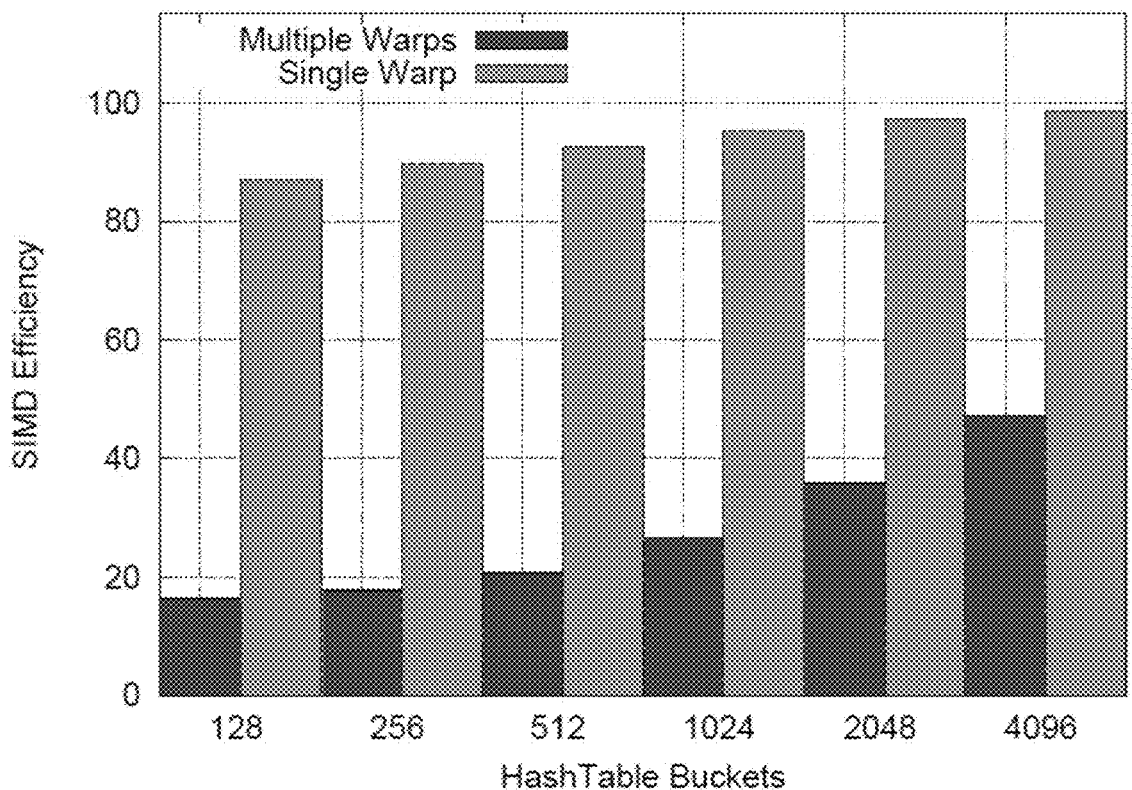
FIG. 6 illustrates divergence overheads as a function of number of hashtable buckets.

FIGS. 4, 5 and 6 illustrate dynamic instruction overhead, memory traffic overhead and divergence overhead respectively as a function of the number of hashtable buckets. These measurements constitute the resources consumed in spinning in an attempt to acquire a lock (synchronization overhead) versus the useful portion of the execution. Overheads are measured on Pascal GTX1080 using Nvidia profiler (nvprof) launching 120 blocks each of 256 threads (74.88% occupancy of the pascal GPU). FIGS. 4, 5 and 6 show significant synchronization overheads that are still persistent in the Pascal architecture. Specifically FIG. 4 shows that instruction count overhead ranges from 61.0% at low contention to 98.3% at high contention. Similarly, FIG. 5 shows that 41.5% to 95.6% of memory operations are due to synchronization. A significant portion of both overheads are due to failed lock acquire attempts. Another source of synchronization overhead, unique to GPUs, is control-flow divergence. FIG. 6 shows that if the code is executed by a single warp, the SIMD utilization (fraction of active lanes) ranges between 87.1%-98.6% but drops to 16.4%-47.1% when executing multiple warps. This is due to inter-warp lock conflicts, which can be impacted by warp scheduling.

Embodiments of the present invention involve systems and methods that enable reliable and efficient support of inter-thread synchronization on SIMT architectures. Specifically, to address the overheads of busy-wait synchronization on SIMT architectures, embodiments of the present invention employ Back-Off Warp Spinning (BOWS), a mechanism to dynamically detect spinning warps and modify warp scheduling. BOWS spin detection mechanism may employ a path history register to identify repetitive execution (i.e., loops). To distinguish busy-wait synchronization loops from other loops a value history register may be employed to track the values of registers used in the computation of the loop exit conditions. In loops not associated with busy-waiting, at least one of these registers typically holds the value of a loop induction variable that changes each iteration. In busy-wait loops these registers typically maintain the same values as long as the warp is spinning. The spin detection results then guides a scheduling policy, BOWS, that is designed to discourage spinning warps from competing for scheduler issue slots. BOWS efficiently approximates software back-off techniques used in multi-threaded CPU architectures while overcoming their limitations when applied to GPUs. In BOWS, warps that are about to execute a busy-wait iteration are removed from competition for scheduler issue slots until no other warps are ready to be scheduled and a certain time has passed since the previous iteration.

Some embodiments of the present invention employ a low cost dynamic spin detection mechanism for SIMT architectures. In other embodiments an inter-thread synchronization aware warp scheduling policy that reduces busy-wait synchronization overheads in SIMT architectures is utilized. Both mechanisms may be used together in other embodiments of the invention.

Baseline SIMT Architectures

We study modifications to the SIMT accelerator architectures as shown in FIG. 7. This architecture is the one deployed in contemporary General Purpose Graphics Processing Units (GPGPUs) (see for example *NVIDIAs Next Generation CUDA Compute Architecture: Fermi,* 2009 and *NVIDIA Tesla P*100, 2016, NVIDIA Corporation). Current GPGPUs consist of multiple processing cores. Each core consists of a set of parallel lanes (or SIMD units). Initially, an application begins execution on a host CPU, then a kernel is launched on the GPU in the form of a large number of logically independent scalar threads. These threads are split into logical groups operating in lockstep in a SIMD fashion (referred to as "warps" by Nvidia and "wavefronts" by AMD). Herein Nvidia's naming convention will be adopted. Each SIMT core interleaves a number of warps on a cycle-by-cycle basis. The Instruction Buffer unit (I-Buffer) contains storage to hold decoded instructions and register dependency information for each warp.

The scoreboard unit is used to detect register dependencies. A branch unit manages control flow divergence. The branch unit abstracts both the storage and the control logic required for divergence and reconvergence.

The issue logic selects a warp with a ready instruction in the instruction buffer to issue for execution. Based on the active mask of the warp, threads that should not execute, due to branch divergence, are disabled. The issued instructions fetch their operands from the register file. It is then executed on the corresponding pipeline (ALU or MEM).

The SIMT architecture achieves its energy efficiency by amortizing the front end costs (i.e., fetching, decoding, and scheduling instructions) across the large number of threads within the same warp executing synchronously the same instruction. Further, it lowers the operating frequency and relaxes the latency requirements of the memory system and functional units compared to contemporary CPUs. To hide this latency, it relies on efficient warp scheduling policies that allows for a net high instruction throughput per cycle.

The SIMT Programming Model

Figure 8:
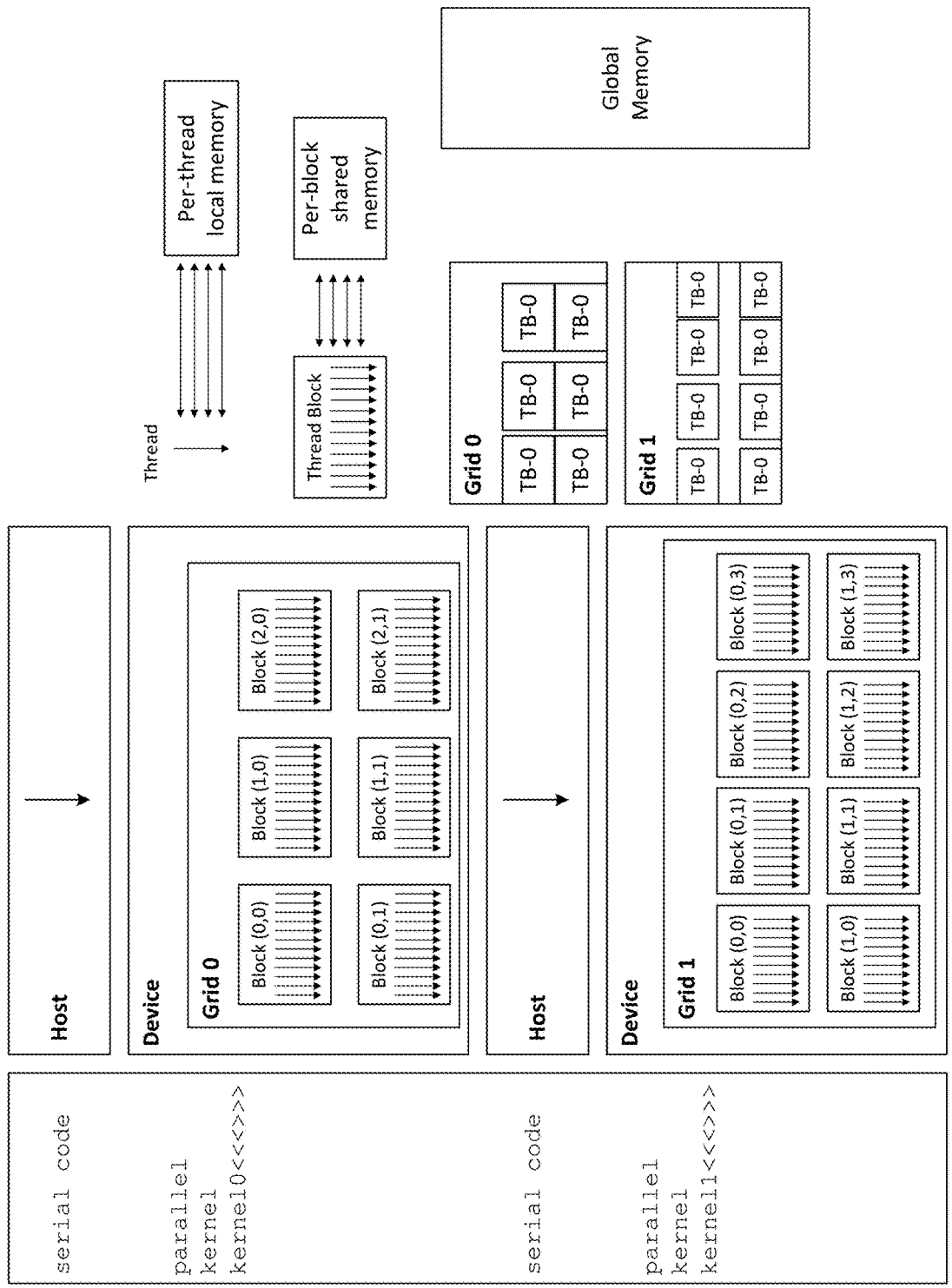
FIG. 8 illustrates a CUDA Programming Model.

The SIMT programming model divides the burden of identifying parallelism differently than traditional approaches of vector parallelism. The programmer, who is armed with application knowledge, identifies far-flung outer-loop parallelism and specifies the required behavior of a scalar thread in the parallel region. FIG. 8 (from FIGS. 7 and 8 of the *NVIDIA CUDA Programming Guide*) shows a typical flow of a CUDA program. The host side (i.e., the CPU) executes the serial portion of the code, allocates the required memory on the device side (i.e., the GPU) and copies the required data from/to the host to/from the device. The programmer decides the number of logical threads required to execute the parallel region. These threads are typically organized as a grid of thread blocks. Threads in the same thread block can communicate through a low latency scratchpad memory referred to as shared memory. Threads in different thread blocks (and even different grids) can still communicate through a slower global memory.

The programming model provides some essential primitives that are required to manage inter-thread communication. These primitives include thread-block scope barriers to synchronize threads within the same thread block, thread-block scope and device scope memory fences to control the observable ordering of shared and global memory reads and writes, and atomic functions that perform read-modify-write atomic operations (e.g., Compare and Swap, Add, Min, Max) where the operation is guaranteed to be performed without interference from other threads. The programmer writes the kernel code from the perspective of a scalar thread and leverages these primitives to manage inter-thread communication across the logically independent threads.

The SIMT programming model, in its essence, does not expose the SIMD nature of the hardware to programmers. It also does not expose the mapping and the scheduling of the logical threads on the available hardware resources. Thus, from a programming model perspective, individual threads progress independently unless otherwise determined by programmers through the use of explicit synchronization primitives. This makes SIMT architectures both easier to program and suitable for a larger set of applications.

Thread Scheduling in SIMT Architectures

Thread scheduling in SIMT architectures is typically done by the hardware. The hardware is responsible for mapping thread blocks to the different processing cores, allocating the required resources for different threads and mapping individual threads to the SIMD units. Throughout the execution of the kernel, SIMT architectures greedily attempts to synchronize threads within the same warp to maximize SIMD units utilization, coalesce their memory accesses to reduce memory traffic, and optimize warp scheduling to efficiently hide long latency operations and harness the existing data locality. Now policies used in thread scheduling will be described.

Threads from The same Warp

As discussed above, SIMT architectures, unlike traditional vector machines, allow for arbitrary control flow divergence. Threads are split into groups (warps) that execute in lockstep on the underlying SIMD units. The warp size in recent GPUs is typically the number of available parallel SIMD lanes. With no divergence, threads within the same warp share the same program counter. However, upon a divergent branch, threads in a warp are allowed to follow different control flow paths. Current implementations achieve this by serializing the execution of different control-flow paths while restoring SIMD utilization by forcing divergent threads to reconverge as soon as possible (typically at an immediate postdominator point).

FIGS. 9 and 10 illustrate a simple example of divergent code and its corresponding control flow graph (CFG) respectively. The bit mask in each basic block of the CFG denotes which threads of a single warp containing four threads will execute that block. The rightmost bit represents thread with thread ID=0. All threads execute basic block A. Upon executing divergent branch $BR_{B-C}^A$, warp $A_{1111}$ diverges into two warp splits $B_{0101}$ and $C_{1010}$ (see for example J. Meng, D. Tarjan, and K. Skadron, "Dynamic Warp Subdivision for Integrated Branch and Memory Divergence Tolerance," *IEEE/ACM Symposium on Computer Architecture (ISCA)*, pages 235-246, 2010). In the notation used herein, branches are abbreviated as BR with a superscript representing the basic block containing the branch and a subscript representing the successor basic blocks. Each warp split is represented by a letter representing the basic block that the split is executing with a subscript indicating the active threads.

The "immediate postdominator (IPDOM)" of the branch $BR_{B-C}^A$ is basic block D, which is the earliest point where all threads diverging at the branch are guaranteed to execute. We say an execution mechanism supports "IPDOM reconvergence" if it guarantees all threads in the warp that are active at any given branch are again active (executing in lockstep) when the immediate postdominator of that branch is next encountered. IPDOM reconvergence is favorable because the immediate postdominator is the closest point at which all threads in a warp are guaranteed to reconverge. Likely convergence (see W. W. L. Fung and T. M. Aamodt, "Thread Block Compaction for Efficient SIMT Control Flow," *IEEE Symposium on High-Performance Computer Architecture (HPCA)*, pages 25-36, 2011) and thread frontiers (see G. Diamos, B. Ashbaugh, S. Maiyuran, A. Kerr, H. Wu, and S. Yalamanchili, "SIMD Re-convergence at Thread Frontiers, *IEEE/ACM Symposium on Microarchitecture (MICRO)*, pages 477-488, 2011) identify earlier reconvergence points that can occur dynamically in unstructured control flow if a subset of paths between branch and IPDOM are executed by a warp.

A mechanism for supporting IPDOM reconvergence using a stack of active masks has been introduced (see W. Fung, I. Sham, G. Yuan, and T. Aamodt, "Dynamic Warp Formation and Scheduling for Efficient GPU Control Flow," *IEEE/ACM Symposium on Microarchitecture (MICRO)*, pages 407-420, 2007). However, there are different possible implementations that can support IPDOM reconvergence as defined above. As noted above, on current hardware the SIMT model is implemented via predication for simple branches, or in the general case using hardware and/or software managed stack-based masking of execution unit.

In these stack-based execution models, the divergent paths are serialized. Thus, in this example, warp split $C_{1010}$ may execute first until executing threads reach basic block D. Then, execution switches to warp split $B_{0101}$. Once the latter threads reach basic block D as well, the four threads reconverge and execute basic block D in lockstep.

Threads from Different Warps

Each cycle, one or more warp schedulers select one of their assigned active warps to be issued for execution. Typically, a scheduling heuristic needs to be used with the objective of efficiently hiding long latency operations and to harness the existing data locality. A simple scheduling policy would be to round robin across the available warps, if the next warp in the round robin order is not pending on data dependency or synchronization dependency (e.g., barrier) and the hardware required to execute its next instruction is available, the warp is issued for execution. This policy is referred to as Loose Round Robin (LRR). LRR guarantees fairness in scheduling different warps. However, this proves to be inefficient to hide long latency operations, as it encourages warps to progress at similar rates reaching high latency code portions at the same time which limits their ability to hide each other's latencies. Further, LRR has negative impact on intra-warp temporal locality, as it allows other warps to evict the data brought to cache by a warp before the warp is rescheduled. Greedy then Oldest (GTO) is another warp scheduling policy that typically outperform LRR. A greedy-then-oldest scheduler consistently selects the same warp for scheduling until it stalls then it moves the oldest ready warp. Older warps are those who are assigned earlier to the hardware resources. In case different warps were assigned at the same cycle (e.g., in the same thread block), warps with the smallest threads IDs are considered older. Compared to LRR, GTO has the advantage of maintaining intra-warp locality as well as getting warps to progress at a different rate which typically allows for better latency hiding. There are other research papers on different warp scheduling policies that uses different heuristics based on different optimization goals (e.g., improving latency hiding, improving locality, reducing barrier synchronization overheads, or reducing load imbalance overhead across warps from the same CTA).

BOWS: Back-Off Warp Spinning

Noted above are some of the limitations of the SIMT execution model that makes correct implementations of inter-thread synchronization on current SIMT machines challenging and unreliable. Embodiments of the invention address the performance side of the SIMT model implications on inter-thread synchronization.

Overheads of fine-grained synchronization have been studied in the context of multi-core CPU architectures (see for example K. Du Bois, S. Eyerman, J. Sartor, and L. Eeckhout, "Criticality Stacks: Identifying Critical Threads In Parallel Programs Using Synchronization Behavior," *IEEE/ACM Symposium on Computer Architecture (ISCA)*, 2013; T. Li, A. R. Lebeck, and D. J. Sorin, "Spin Detection Hardware for Improved Management of Multithreaded Systems," *IEEE Transactions on Parallel and Distributed Systems*, 2006; E. Vallejo, R. Beivide, A. Cristal, T. Harris, F. Vallejo, O. Unsal, and M. Valero, "Architectural Support For Fair Reader-Writer Locking," *IEEE/ACM Symposium on Microarchitecture (MICRO)*, 2010; and W. Zhu, "Synchronization State Buffer: Supporting Efficient Fine-Grain Synchronization on Many-Core Architectures," *IEEE/ACM Symposium on Computer Architecture (ISCA)*, 2007).

However, the scale of multi-threading and the fundamental differences in the architecture in SIMT machines hinders the direct applicability of these CPU solutions. In SIMT machines, barrier synchronization overheads have been recently studied (see for example J. Liu, J. Yang, and R. Melhem, "Saws: Synchronization Aware GPGPU Warp Scheduling For Multiple Independent Warp Schedulers," *International Symposium on Microarchitecture (MICRO)*, 2015, pages 383-394; and Y. Liu, Z. Yu, L. Eeckhout, V. J. Reddi, Y. Luo, X. Wang, Z. Wang, and C. Xu, "Barrier-Aware Warp Scheduling For Throughput Processors," *International Conference on Supercomputing (ICS)*, 2016, page 42). These studies proposed warp scheduling policy that accelerate warps that have not yet reached a barrier to enable other warps blocked at the barrier to proceed. However, fine grained synchronization, with busy-wait synchronization is a fundamentally different problem. In barrier synchronization, warps that reach a barrier are blocked and do not consume issue slots. However, with busy-wait synchronization, threads that fail to acquire a lock spin compete for issue slots and, in the absence of coherent L1 caches, memory bandwidth.

Yilmazer and Kaeli (see A. Yilmazer and D. Kaeli, "HQL: A Scalable Synchronization Mechanism for GPUs," *International Symposium on Parallel and Distributed Processing (IPDPS)*, 2013) quantified the overheads of spin-locks on GPUs and proposed a hardware-based blocking synchronization mechanism called hierarchal queue locking (HQL). HQL provides locks at a cache line granularity by adding flags and pointer meta-data for each L1 and L2 block, which can be in one of six states. Negative acknowledgments are used when queues are filled and in certain race conditions. An acquire_init primitive is added to the application to setup a queue. While HQL achieves performance gains when an application uses a small number of locks relative to threads, it can experience a slowdown when using a large number of locks concurrently. Moreover, HQL adds significant area to the caches and requires a fairly complex cache protocol.

Criticality-Aware Warp Acceleration (CAWA) uses run-time information to predict critical warps (see S.-Y. Lee, A. Arunkumar, and C.-J. Wu, "CAWA: Coordinated Warp Scheduling and Cache Prioritization for Critical Warp Acceleration of GPGPU Workloads," *International Symposium on Computer Architecture*, 2015). Critical warps are those that are slowest in a kernel and as they determine execution time CAWA prioritizes them. CAWA estimates warp criticality using a criticality metric that predicts which warp will take longer time to finish. CAWA is reported to outperform greedy-than-oldest (GTO) warp scheduling across a range of traditional GPGPU workloads. However, CAWA can reduce performance for busy-wait synchronization code as its criticality predictor tends to prioritize spinning warps.

Embodiments of the present invention employ Back-Off Warp Spinning (BOWS), a scheduling policy that prevents spinning warps from competing for scheduler issue slots. BOWS approximates software back-off techniques used in multi-threaded CPU architectures, which incur limitations when directly applied to GPUs (see for example T. E. Anderson, "The Performance of Spin Lock Alternatives for Shared-Memory Multiprocessors," *IEEE Transactions on Parallel and Distributed Systems*, 1990). Warp prioritization in stack-based SIMT architectures is complicated by the fact that some threads within a warp may hold a lock while others do not. In BOWS warps that are about to execute a busy-wait iteration are removed from competition for scheduler issue slots until no other warps are ready to be scheduled. On GPU kernels using busy-wait synchronizations BOWS achieves a speedup of 1.5 times and energy savings of 1.6 times versus CAWA.

Sensitivity to Warp Scheduling

The overheads of busy-wait synchronization on recent SIMT hardware was discussed above. Here the impact of warp scheduling policies is considered. Greedy then Oldest (GTO) scheduling selects the same warp for scheduling until it stalls then moves to the oldest ready warp. Older warps are those with lower thread IDs. GTO typically outperforms Loose Round Robin (LRR). In CAWA, warp criticality is estimated as: $nInst \times w.CPI_{avg} + nStall$, where nInst is an estimate of remaining dynamic instruction count (based on direction of branch outcomes), $w.CPI_{avg}$ is per-warp, and nStall is the stall cycles experienced by a warp. Critical warps are prioritized.

Figure 11:
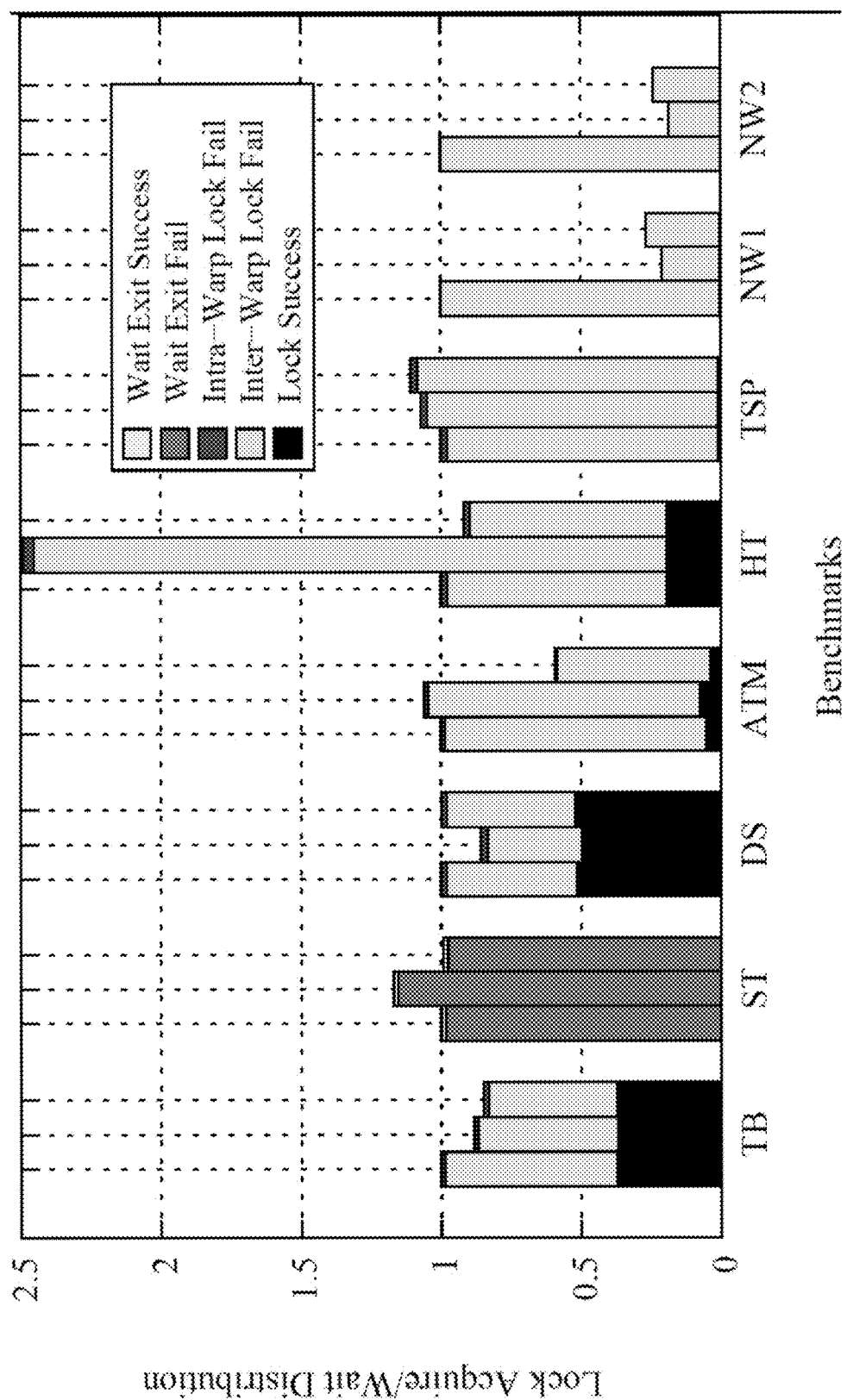
FIG. 11 illustrates synchronization status distributions.

FIG. 11 illustrates synchronization status distributions (simulated with GPGPU-Sim with a GTX480 configuration) with the bars from left to right representing LRR, GTO, and CAWA respectively. FIG. 11 plots the distribution of lock acquire attempts in lock-based synchronization and the wait exit attempts in wait and signal based synchronization using LRR, GTO, and CAWA scheduling policies. The figure also shows the distribution of whether the lock acquire failure is because the lock is held by a thread within the same warp (i.e., intra-warp lock fail) or in a different warp (i.e., inter-warp lock fail). As can be seen, most lock failures are due to inter-warp synchronization. The figure shows that inter-warp conflicts are significantly influenced by the warp scheduling policy.

Note that none of these policies are busy-wait synchronization aware patterns. For example, GTO is not a fair scheduler, which is problematic when an application requires different threads to communicate to guarantee the overall forward progress of execution. We find GTO scheduling can lead to livelocks in applications with inter-thread synchronization. Under contention warps with low priority find the memory pipeline busy and when the pipeline is empty higher priority warps are scheduled first. Starvation or even livelocks may occur if warps of lower priority manage to acquire locks. LRR may also lead to very inefficient scheduling patterns as it rotates scheduling priority through warps including those spinning in a busy-wait loop. Instead, an efficient policy would prioritize warps executing a critical section. Similarly, CAWA is not synchronization aware and may lead to very inefficient scheduling patterns. The CAWA criticality predictor increments (or decrements) its estimate for the number of remaining dynamic instructions based on the difference between the current program counter (currPC) and the target program counter (nextPC) for encountered backward (or forward) branches respectively. This will tend to increase the priority of spinning warps as they execute the spin-inducing backward branch. This is the opposite action to that needed to improve efficiency (spinning warps should be scheduled less, not more).

Figures 12, 13:
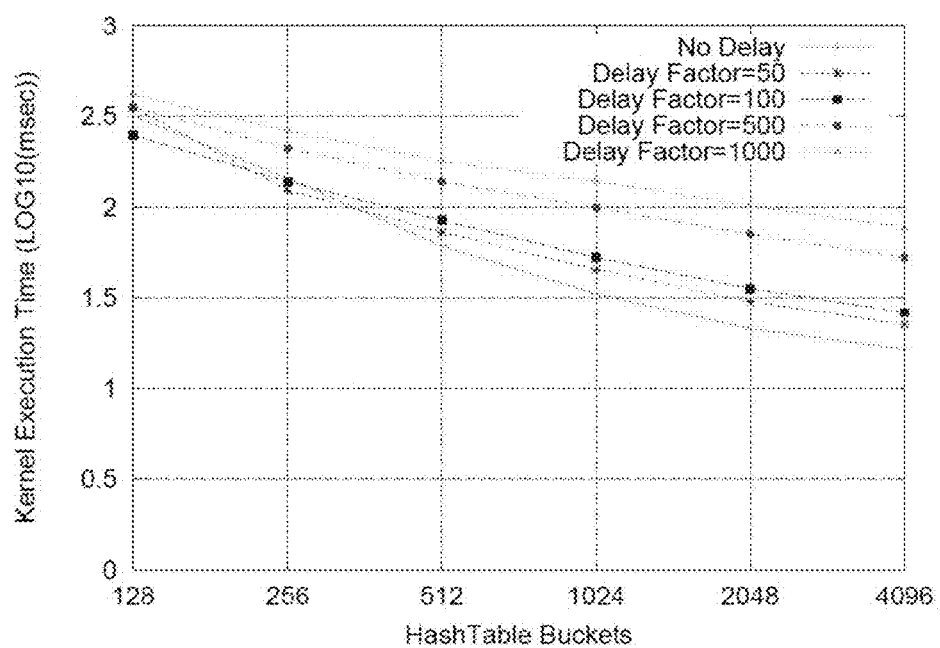
FIG. 12 illustrates software backoff delay code.
FIG. 13 illustrates software backoff delay performance.

FIG. 13 plots execution time of the hashtable insertion code in FIG. 2 augmented with the software-only backoff delay code in FIG. 12 running on GTX-1080 hardware. The results suggest that adding a backoff delay to a spin-lock degrades performance on recent GPUs. The reason is that, except at very high levels of contention, the benefits of reduced memory traffic appear insufficient to make up for wasted issue slots executing the delay code itself.

BOWS: Backoff Warp Spinning

Embodiments of the present invention address wasted issue slots by utilizing Back-Off Warp Spinning (BOWS), a hardware scheduling mechanism that reduces the priority of spinning warps. BOWS can be utilized when synchronization loops have been identified by programmer, compiler or using a hardware spin detection mechanism, DDOS, described below.

The scheduling policies discussed above suffer from two limitations:

1. The scheduler may prioritize spinning warps in the competition for issue slots over other eligible non-spinning ones. This slows down the progress of non-spinning warps. In cases when these non-spinning warps are holding locks, this decision also slows down the forward progress of spinning warps.
2. The scheduler may return back to the same spinning warp too early even if it was at the bottom of the scheduling priority because other warps are stalling on data dependencies.

BOWS avoids these issues by modifying an existing warp scheduling policy as follows:

1. It discourages warps from attempting another spin loop iteration by inserting the warp that is about to execute another iteration into the back of the warp scheduling priority queue. Warps in this state are called Backed-off Warps (i.e., they have just executed a spin-inducing branch and are currently backed-off from issuing their next instruction). Once a warp in the backed-off state issues its next instruction its priority reverts to normal and it leaves the backed-off state. This strategy gives non-spinning warps an opportunity to obtain issue slots. This in turn increases the chances that spinning warps would be successful when they attempt their next iteration.
2. It sets a minimum time interval between the start of any two consecutive iterations of a spin loop by the same warp. Warps that are about to start a new spin loop iteration prior to the end of their interval are not eligible for scheduling. The appropriate value for this time interval can be estimated statically through profiling or dynamically using run-time heuristics.

In some embodiments, BOWS requires that Spin-Inducing Branches (SIBs) have been identified. SIBs are the backward branch of each spin loop. Once a warp executes a SIB, the scheduler control unit triggers BOWS logic. We discuss a hardware mechanism to detection SIBs below. However, BOWS operation is independent on how the detection of spin loops is performed. Alternatives to a hardware mechanism are when the instruction set supports a flag that can label branch instructions to be spin-inducing branch. A compiler can compile to these instructions if it suspects the branch may be spin-inducing. This may be done through compiler analysis, or if the language supports APIs for synchronizations. A hybrid technique is also possible, where a compiler may provide hints to potential spin-inducing branches and hardware can utilize this information in a dynamic determination.

BOWS is an extension, and not a replacement, to existing warp scheduling policies (e.g., LRR, GTO, or CAWA). BOWS extends these scheduling policies to be synchronization aware. In this way the operation of BOWS is independent of the accompanying scheduling policy. BOWS adopts two orthogonal strategies. First, it discourages warps that have just executed a spin-inducing branch from executing the following instruction (i.e., attempting another loop iteration) by inserting the warp into the back of the warp scheduling priority queue used by the baseline (modified) GTO scheduler. Warps in this state are called Backed-Off Warps (i.e., they have just executed a spin-inducing branch and are currently backed-off from issuing their next instruction). Once a warp in the backed-off state issues its next instruction its priority reverts to normal and it leaves backed-off state. This strategy is give non-spinning warps an opportunity to obtain issue slots. This in turn increases the chances that spinning warps would be successful when they attempt their next iteration. However, this strategy may still lead to unnecessary overheads when the scheduler yields to the spinning warps too early because other warps are stalling on data dependencies. This tends to happen when most warps are spinning. Second, to address this BOWS uses a back-off delay to prevent a warp from attempting consecutive iterations of a busy-wait loop rapidly. This reduces memory contention (cf. software-based backoff) and wasted issue slots with the premise that it is unlikely that a change in the busy-wait exit condition has happened in a short period of time.

An intuitive thread scheduling policy would simply be to deprioritize spinning threads. Under this policy non-spinning threads that execute useful instructions will have an advantage in the competition over issue slots and they will make faster progress. In cases when these non-spinning threads are holding locks, they would reach lock release code sooner allowing other threads to make forward progress. However, scheduling in SIMT architectures is on a warp granularity. This creates a challenge as the same warp may have spinning and non-spinning threads. One might expect that if the current active threads in a warp are spinning the best policy would be to deprioritize the entire warp. However, this is not the case. Due to the way divergence is handled in SIMT architectures, and how busy-wait synchronization is coded on current SIMT architecture, the forward progress of all threads within the same warp is tightly coupled. Delaying the spinning threads also delays non-spinning threads in the same warp. This is harmful to performance if the progress of the non-spinning threads are crucial to the forward progress of other threads. Furthermore, with nested locking a thread may fail to acquire an inner lock and thus need to release previously acquired outer lock before trying again. This thread would be still identified as spinning, but delaying it prior to it releasing any held locks would be harmful to performance. Another challenge is that to reduce area cost our spin detection mechanism detects spinning on a warp granularity by using the behavior of one active thread as a sample and generalizes this to the whole warp.

Detecting spinning on granularity of threads would be very expensive. To address these challenges, we build on the following observation: for a deadlock-free synchronization on current SIMT architectures, the lock-release statement in a lock-based synchronization has to be included inside the body of the spin loop. This is also true for a signal code in a wait and signal synchronization pair (which is distinct from CUDA's named barriers). The key to address the above challenges is to deprioritizes warps only when they are about to attempt a new iteration in a spin loop. At this point there are no threads from the warp in the critical section. BOWS relies on the information in the SIB-PT to detect when a warp is about to attempt a new spin loop. A warp that has just executed a taken spin-inducing branch as identified by the SIB-PT is deprioritized (backed-off) regardless of its own (predicted) spinning state. Once the warp issues its first instruction after the spin-inducing branch, the warp priority reverts to normal.

BOWS Operation

Embodiments of BOWS work as follows: Once a warp exits its backed-off state, a pending back-off delay register is initialized to the back-off delay limit. The warp then continues execution normally with the pending back-off delay register decremented every cycle. In alternative embodiments, the back-off delay register could be decremented every n clock cycles, or some value could be subtracted from the value every cycle. Alternatively the back-off delay register could be set to a negative value and could increase or be incremented based on a clock cycle. If the warp executes a SIB it is prevented from issuing its next instruction until its back-off delay is zero. In alternative embodiments the determination of the expiration of the back-off delay is based on a comparison with some other value than zero. Thus, the back-off delay limit determines the minimum duration required before two consecutive attempts of a busy-wait loop. The back-off delay value can be a fixed value determined by a programmer or a compiler, can be determined through profiling or can be tuned adaptively at run time.

Figure 14:
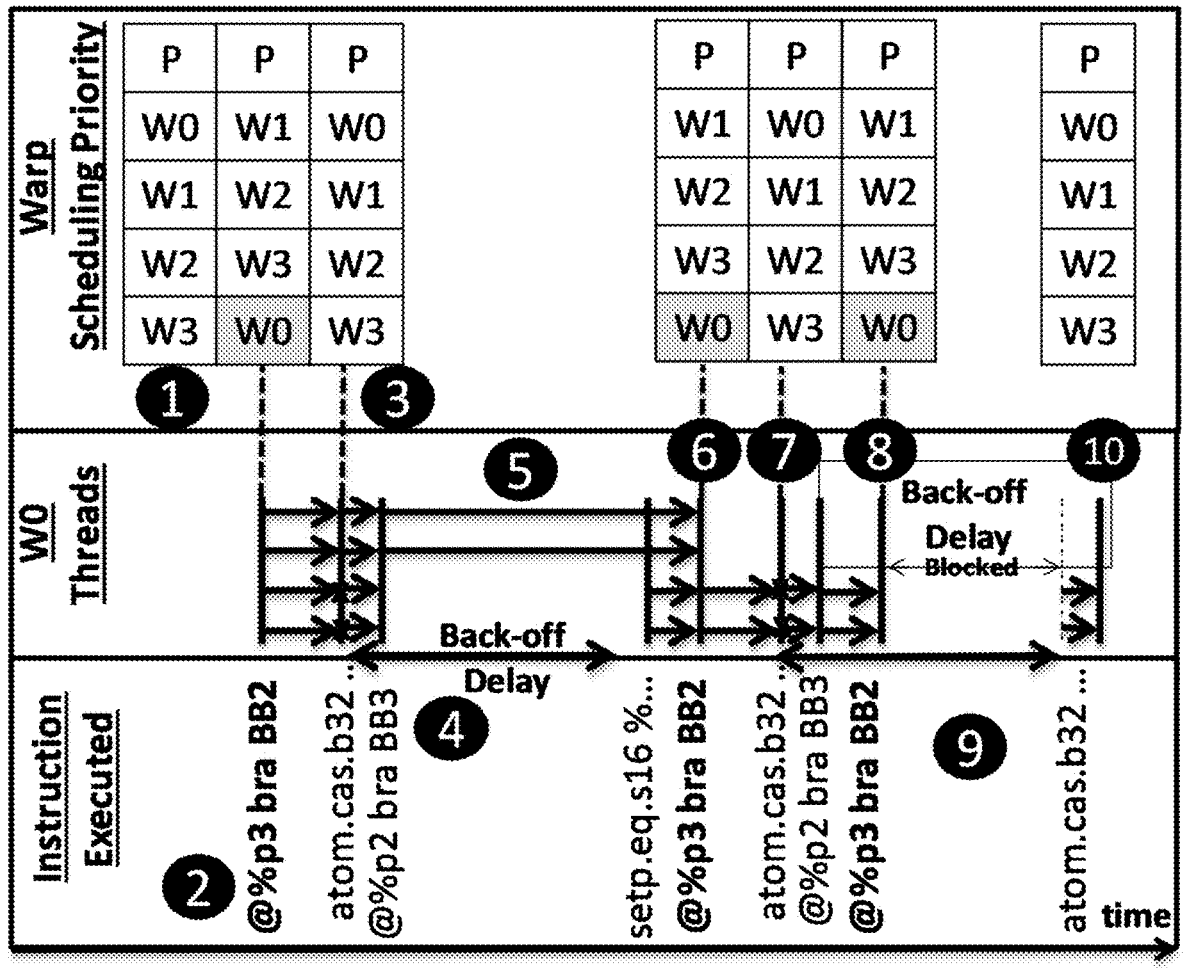
FIG. 14 illustrates a backoff warp spinning scheduling policy.

FIG. 14 shows an example of BOWS operation for warp W0 containing four threads for the code in FIG. 19. In this example, backward branch:

0x098: % p3 bra BB2;

has been identified as a SIB. Scheduling priority is shown in the top of FIG. 14. Initially, W0 has high priority ①. Once W0 encounters a spin-inducing branch ②, it is pushed to the back of the priority queue and marked as backed-off (shaded in FIG. 14). The scheduler from selecting W0 and thus helps to reduce contention on acquiring a lock that is currently held by another thread. W0 is scheduled when other warps are stalling (e.g., on memory accesses for line 6 in FIG. 2) and executes the lock-acquire atomic compare and swap instruction (FIG. 19 at PC=0x030). At this point ③ three actions are taken: First, the warp loses its backed-off state; second, the warp priority reverts to normal; and third a back-off delay value is stored in the warp pending back-off delay register ④. Two threads of W0 successfully acquire the lock and proceed to the critical section while the other two threads fail ⑤. Threads reconverge at the setp instruction and execute the spin-inducing branch. The two threads that executed the critical section exit the spin loop while the others proceed to another iteration. Once the spin-inducing branch is executed, the warp enters backed-off state and is pushed to the end of the priority queue ⑥. As the duration of the critical section is larger than that of the back-off delay limit W0's back-off delay is already zero and so W0 is eligible for scheduling. After W0 is scheduled it executes the lock acquire and the two remaining threads in the spin loop again fail to acquire a lock ⑦. The two threads immediately proceed to another iteration of the spin-loop ⑧. However, once W0 enters the backed-off state, they cannot be scheduled until the pending back-off delay is zero ⑨. This prevents the threads from repeating lock-acquires in a short period of time. Once the pending back-off delay is zero, the W0 is eligible for scheduling ⑩.

Adaptive Back-off Delay Limit

A small back-off delay may increase spinning overheads while a large back-off delay may throttle warps more than necessary. Below we explore different values for the back-off delay limit as might be set via profiling. The delay can be also tuned adaptively at run time. Here one method is presented to perform this adaptive tuning. The key idea is that we want to reduce spinning overheads as much as possible in favor of useful instructions. We adaptively set the delay by trying to maximize $$\frac{\text{Useful Instructions}}{\text{Spinning Overheads}}$$

over a window of execution. We use:

$$\frac{\text{Total Instructions}}{\text{SIB Instructions}} = \frac{\text{Useful Instructions} + (\text{SIB Instructions} \times \text{Average Spin Overhead})}{\text{SIB Instructions}}$$

as an approximation. Since the average spin overhead is almost constant across the execution of the same kernel the ratio of the $$\frac{\text{Total Instructions}}{\text{SIB Instructions}}$$

is proportional to $$\frac{\text{Useful Instructions}}{\text{Spinning Overheads}}.$$

The pseudo code in FIG. 15 summarizes the adaptive back-off delay limit calculation. This algorithm is applied over successive time windows. During the current window the adaptive back-off delay estimation algorithm computes the back-off delay limit to use during the next window. Initially, the scheme attempts to increase the back-off delay limit by a fixed step as long as a non-negligible ratio of dynamic spin-inducing branches is executed. However, if the ratio of $$\frac{\text{Total Instructions}}{\text{SIB Instructions}}$$

in the current execution window is considerably smaller than the ratio in the previous window the back-off delay limit is decremented by a double step. Finally, lower and upper limits are applied to the back-off delay limit.

DDOS: Dynamic Detection of Spinning

It is possible to identify spin loops when explicit busy-wait synchronization APIs are used. The compiler can then translate a lock acquire API into a busy wait loop with the backward branch of the loop flagged as a spin-inducing branch. However, such APIs are not available in current SIMT programming models. In this section, we describe a mechanism for dynamically detecting SIBs.

Current GPU programmers write synchronization code tailored to their specific application scenario. This increases the challenge of supporting synchronization aware thread scheduling. For example, FIG. 16 shows an implementation of two nested locks that avoid SIMT-induced deadlocks from ATM. FIG. 17 shows an implementation of a global lock from TSP where the execution of the critical section is serialized across threads from the same warp. Unlike the implementation in FIG. 2, the serialization is opted when implementing a global lock to avoid the unnecessarily memory contention that would have been created if all threads within the same warp are active. FIG. 18 shows busy-wait synchronization from the ST kernel in BH that implements a wait and signal synchronization rather than a lock. A thread waits in a spin loop for a condition set by another thread.

The large variety of synchronization patterns makes it challenging to detect busy-wait synchronization statically or to introduce primitives that support all use cases and avoid SIMT-induced deadlocks (see A. ElTantawy and T. M. Aamodt, "MIMD Synchronization on SIMT Architectures," *IEEE/ACM Symposium on Microarchitecture (MICRO)*, 2016, incorporated herein by reference). It also shows that it would be challenging to design a limited set of explicit synchronization primitives that efficiently model the different synchronization scenarios. Such support would also require an extensive compiler effort to avoid SIMT-induced deadlocks and/or significant hardware modifications to the divergence handling mechanism.

Embodiments of the present invention utilize a hardware mechanism, Dynamic Detection of Spinning (DDOS), to detect spinning warps. DDOS seeks to identify Spin-Inducing Branches (SIBs). We define a SIB as a backward branch that maintains the spinning behavior. To identify a SIB, DDOS first makes a prediction regarding whether each warp is currently in a spinning state or not.

As noted in T. Li, A. R. Lebeck, and D. J. Sorin, "Spin Detection Hardware for Improved Management of Multi-threaded Systems," *IEEE Transactions on Parallel and Distributed Systems*, 2006, a thread is spinning between two dynamic instances of an instruction if it executes the instruction and later executes the same instruction again (e.g., in another loop iteration) without causing an observable change to the net system state (i.e., to its local registers or to memory). Ti et al. proposed a thread spinning detection mechanism for multi-threaded CPUs that tracks changes in all registers. Directly applying such a technique to a GPU would be prohibitive given the large register files required to support thousands of hardware threads.

DDOS detects busy-wait loops in two steps. First, it detect the presence of a loop. DDOS does this by tracking the sequence of program counter values of a warp. Second, DDOS speculates whether a loop identified in the first step is a busy-wait loop or a normal loop. To distinguish these cases it leverages the observation that typically in normal loops found in GPU code an induction variable changes every iteration. Moreover, this induction variable typically contributes to the computation of the loop exit condition. In NVIDIA GPUs the loop exit condition and the divergence behavior of a thread are typically determined using a set predicate instruction (available both in PTX and SASS). The AMD Southern Islands ISA has an equivalent vector compare instruction (v_comp). For each thread in a warp, the set predicate instruction compares two source registers and writes the result to boolean destination register. The boolean values are typically used to predicate execution of both normal and branch instructions (e.g., instructions at address 0x090 and 0x098 in FIG. 19). In normal (none busy-wait) loops, the value of at least one source register of the set predicate (setp) instruction(s) that determine the loop exit condition change each iteration. In a 'for' loop, one of these registers would be the loop counter. DDOS tracks only the values of source registers of the set predicate instructions in determining whether a loop is a normal loop (i.e., setp source register values change) or a busy-wait spin loop (setp source register values do not change).

DDOS Operation

Figures 20, 22:
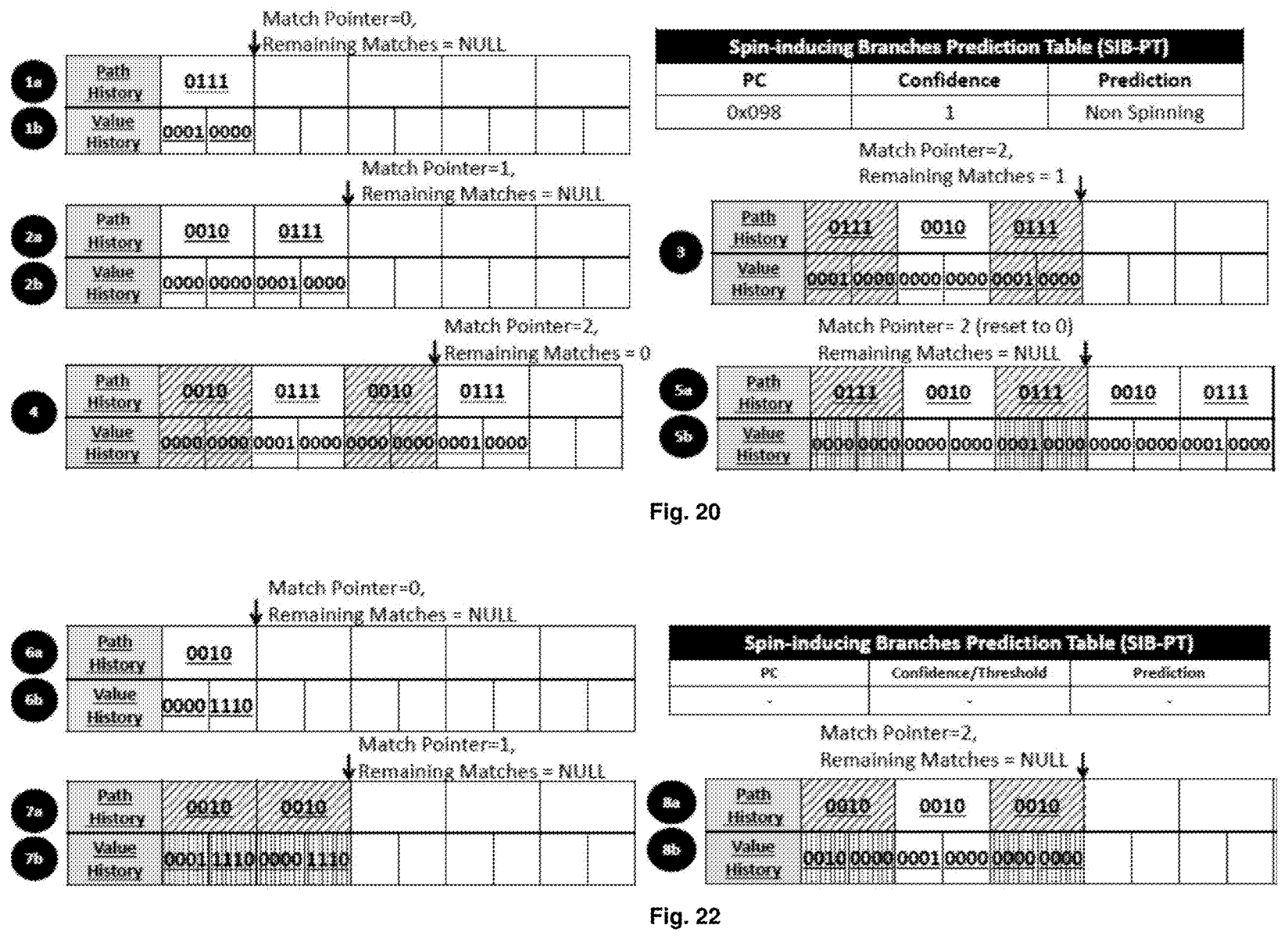

Conceptually, the spin loop detection step of DDOS works as follows: Each warp has two shift registers, a Path History Register and a Value History Register (FIGS. 20 and 22). These registers track the execution history of the first active thread in the warp. We refer to this thread as the "profiled" thread. The Path History Register tracks program counter values of setp instructions. The Value History Register tracks the values of the source registers of setp instructions. To reduce storage overhead, some embodiments of the present invention can hash program counter and source operand values before adding them to the Path History and Value History Registers. As elaborated upon below, the Value History Register may be implemented in the execution stage where the source operands of the setp instruction is readily available. DDOS examines entries in Path and Value History Registers looking for repetition. If it finds sufficient repetition DDOS classifies the profiled thread as being in a spinning state.

FIGS. 19, 20, 21 and 22 illustrate the operation of Path and Value History Registers on PTX assembly examples with (FIG. 19) or without (FIG. 21) busy wait code. The code in FIG. 19 is approximately equivalent to the code in FIG. 2. In FIG. 19 assume the first active thread is executing the setp instruction at PC=0x038. In actual execution, the program counter may have been already advanced to the next instruction. However, for the discussion to be more intuitive, we assume the current program counter matches the executed instruction. In the busy-wait example in FIG. 20, the program counter is first hashed using:

$$((PC-PC_{kernelstart})/InstructionSize) \% m),$$

where $PC_{kernelstart}$=0x0000, m=4 and InstructionSize=8.

Other hashing methods are possible in alternative embodiments and are discussed below. The result (0x7) is inserted into the Path History Register ("1a"). In parallel, the source operand values of the setp instruction (i.e., % r15 and '0') are hashed and added to the Value History Register. We assume the profile thread fails to acquire the lock so that % r15 is '1'. Only the least significant k-bits (here k is 4) are used ("1b"). To detect repetition DDOS keeps track of two other values, Match Pointer and Remaining Matches. The Match Pointer identifies which m-bit (k-bit) portion of the Path (Value) History Register to compare new insertions against. For each insertion into the path (value) history registers, the entry before the match pointer is compared with the new entry. If they are equal, a loop is detected. To enable better selectivity DDOS requires multiple consecutive loop detections before identifying a spin-inducing loop. To facilitate this the remaining matches register tracks the number of remaining matches required before DDOS declares the profiled thread (and thus warp) to be in a spinning state.

Continuing the example in FIG. 20, eventually the warp executes the setp instruction at PC=0x90 in FIG. 19. The entries in both shift registers are (logically) shifted to the right and new values inserted to their left. No match is found between the new entry (0x2) and the entry before the match pointer (0x7) ("2a"). As the profiled thread fails to acquire the lock % r21 remains '0'. Thus, the value history register is updated with two 4-bit zero values ("2b"). When the warp reaches PC=0x038 again we assume the profiled thread again fails to acquire the lock leading to a match in both path and value histories ("3"). Once a match is detected, the match pointer is fixed and the remaining matches value is initialized to (match pointer-1).

The updates to the match pointer and the remaining matches can be controlled through a small 4-state finite state machine has the comparison operation result as its input, and match pointer, remaining matches, and spinning state as its outputs. Recall the remaining matches value represents how many extra matches are needed to confirm spinning behavior. In this example, we need only 1 extra match.

Once the warp reaches the setp instruction at PC=0x090 again an additional match is found ("4"). Since the remaining matches value is now zero, the warp is identified as in a spinning state. After the profiled thread successfully acquires the lock the execution of the setp instruction at PC=0x040 leads to a mismatch in the value history and the warp loses its spinning state ("5b").

Next, we describe how DDOS identifies Spin-inducing Branches (SIBs). The key is that, if a backward branch is executed by a warp in a spinning state, it is likely spin-inducing (i.e., leads to a new iteration in the busy-wait loop).

To detect SIBs DDOS employs a spin-inducing branch prediction table (SIB-PT). The SIB-PT, shown in FIG. 20, is shared between warps executing on the same SM. The SIB-PT maintains a confidence value for each branch under consideration. When a warp is in a spinning state and it executes a backward branch if that branch is not in the SIB-PT then it is added with a confidence value of 1. If the branch is in the SIB-PT, its confidence value is incremented.

Once the confidence reaches a threshold the branch is identified as a spin-inducing branch. To guard against accumulated path and value hash aliasing errors that could happen over an extended period of execution, a nonzero confidence value for a branch that is not yet confirmed as spin-inducing is decremented every time the branch is taken by a warp that is currently classified as non-spinning. In some embodiments, the threshold is a constant fixed for a given architecture (determined empirically). In alternative embodiments, the threshold could be determined by the compiler, based on an API, or based on adaptive hardware that can determine the value dynamically.

Returning to the example in FIG. 20, initially, the SIB-PT is empty. Once the warp executes the backward branch at PC=0x098 while in the spinning state (i.e., after "(4)" and before ("5")) the branch is added to the SIB-PT with its confidence set to '1'. Assuming a confidence threshold of 4, three more instances where the backward branch at PC=0x098 is executed by a spinning warp would be required before this branch is confirmed as a Spin-inducing Branch. Larger threshold values reduce false predictions but lead to longer detection time. An analysis of the sensitivity to the threshold value is presented below.

Next, we briefly explain DDOS operation with a normal loop example. The PTX code in FIG. 21 is the assembly of a 'for' loop in k-means. The backward branch is at 0x060 and its associated setp is at 0x058. The first source operand %r20 represents the 'for' loop induction variable that is incremented by one every iteration (at 0x050), while %r15 is a copy of the kernel input indicating the number of loop iterations. The PC of the setp instruction is hashed to (0x2) and inserted into the Path History Register every time the instruction is executed ("6a"), ("7a"), ("8a"). In contrast to the busy-wait case, the contents of %r20 changes each iteration causing a mismatch with every insertion to the value history register (("7b") and ("8b")).

DDOS Design Trade-offs

DDOS as described above has different design parameters that can be adjusted in different embodiments of the invention. Some of these are the hashing function and width (m and k), the confidence threshold (t), and the number of entries in the history shift register (l). We evaluate the impact of these parameters on the following metrics: (1) Average True Spin Detection Rate (TSDR), which is the percentage of spin-inducing branches accurately identified by DDOS; (2) Average False Spin Detection Rate (FSDR), which is the percentage of non-spin-inducing branches incorrectly classified as spin-inducing; and (3) Avg. Detection Phase Ratio (DPR), which is the average ratio of the detection phase duration of a branch to the cycles executed from the first encounter to the last encounter of the branch. The detection phase duration of a branch measures how many cycles were required to confirm a branch as a spin-inducing branch after its first encounter. For spin-inducing branches it is preferable to have a short detection phase. For each branch, these metrics are averaged over the different SMs that execute the branch, and over the different launches of the kernel that include the branch. For ground truth, we consider branches that are used to implement busy-wait synchronization as true spin-inducing branches.

The table below shows the sensitivity of these metrics to the different design parameters averaged over a variety of benchmarks.

| | Avg. TSDR | Avg. DPR | Avg. FSDR | Avg. DPR |
|---|---|---|---|---|
| Sensitivity to the hashing function "h" at t = 4 and l = 8 | | | | |
| h | | | | |
| XOR, m = k = 4 | 1 | 0.041 | 0.016 | 0.006 |
| XOR, m = k = 8 | 1 | 0.041 | 0 | — |
| MODULO, m = k = 4 | 1 | 0.041 | 0.17 | 0.014 |
| MODULO, m = k = 8 | 1 | 0.041 | 0.104 | 0.001 |
| Sensitivity to Hashed Path/Value Width "m/k" at t = 4, l = 8, and h = XOR | | | | |
| m/k | | | | |
| 2 | 1 | 0.042 | 0.078 | 0.062 |
| 3 | 0.983 | 0.074 | 0.012 | 0.008 |
| 4 | 1 | 0.041 | 0.016 | 0.006 |
| 8 | 1 | 0.041 | 0 | 0 |
| Sensitivity to Confidence Threshold "t" at m = k = 4, l = 8, and h = XOR | | | | |
| t | | | | |
| 2 | 1 | 0.03 | 0.027 | 0.016 |
| 4 | 1 | 0.041 | 0.016 | 0.006 |
| 8 | 1 | 0.075 | 0.002 | 0.002 |
| 12 | 0.992 | 0.105 | 0.002 | 0.003 |
| Sensitivity to History Registers Length "l" at t = 4, m = k = 8, and h = XOR | | | | |
| l | | | | |
| 1 | 0 | 0 | 0 | 0 |
| 2 | 0 | 0 | 0 | 0 |
| 4 | 0.625 | 0.032 | 0 | 0 |
| 8 | 1 | 0.041 | 0 | 0 |
| Sensitivity to Time Sharing of History Registers "sh" at l = 8, t = 4, h = XOR, and epoch = 1000 | | | | |
| sh | | | | |
| 0, m = k = 4 | 1 | 0.041 | 0.016 | 0.006 |
| 0, m = k = 8 | 1 | 0.041 | 0 | 0 |
| 1, m = k = 4 | 0.642 | 0.211 | 0.033 | 0.023 |
| 1, m = k = 8 | 0.642 | 0.211 | 0.026 | 0.003 |

Hashing Function: The top sub-table in the table above studies the impact of XOR and MODULO hashing. In XOR hashing, the values inserted into the path register are hashed as follows (PC[m−1:0] xor PC[2 m−1:m] xor PC[3 m−1:2 m] . . . xor PC[31:32−m]), where PC is the program counter at the execution of a setp instruction. The value register XOR hashes are computed similarly but using the source registers in the setp instructions. In MODULO hashing, values are hashed by considering only the least significant m (k) bits of the value (as in FIGS. 20 and 22. XOR hashing considerably reduces false detections compared to MODULO hashing. With 8-bits hashing width, the XOR hashing has a zero false detection rate. False detections occur in Merge Sort and Heart Wall with MODULO hashing due to loops with power-of-two induction variable increments larger than $2^k$.

Hashing Width: The impact of the hashing width is quantified in the second sub-table above. A 2-bit path and value width leads to aliasing that leads to a 7.8% false detection rate. With three bits the aliasing impact is smaller and eight bits are enough to eliminate false detections with XOR hashing.

Confidence Threshold: The third sub-table above shows that as the confidence threshold (t) increases, the false detection rate decreases but the detection phase ratio increases for true detections. With t=12 some SMs fail to confirm a spin-inducing branch (e.g., TB kernel of BH).

Hashing Registers Length: The fourth sub-table above shows the sensitivity to the history length (1), which determines the number of setp instructions DDOS can track. Path and value registers that store "l" entries of history can detect a loop that involve up to "l−1" set predicate instructions. A length of two instances fails to capture any repetitiveness in history. A history of four instances fails to capture the spin loops in one benchmark (NW: Needleman-Wunsch). This benchmark has two spin loops in two different kernels but each of them are launched several times. The loop involves four setp instructions, and thus DDOS needs at least five entries in its history registers to detect their spin behavior.

Time Sharing of History Registers: As the goal of DDOS is to classify static instructions as either SIB or not, tracking path and value histories for all warps seems unnecessary. The results of time-sharing a single set of path and value history registers among different warps in an SM is shown in the last sub-table above.

The final outcome from DDOS is the confirmed spin-inducing branches which can be identified even if a single warp is monitored and this warp has gone through the spin loop for sufficient number of times. Therefore, there is no need to monitor all warps during their full execution interval. However, it may be necessary to monitor all the warps at least at some of the time because different warps may cover different static portions of the code. To exploit this opportunity, we amortize the history registers cost by time-sharing them across different warps.

Here a warp uses the history registers for a certain predetermined and fixed interval (1000 cycles), then another warp uses them. Time sharing reduces detection accuracy as the profiled warp may not complete a full spin twice within its time sharing interval and thus some SIBs may not be detected. With a single warp, time sharing leads to a longer detection phase, In the evaluations below, we use "h=XOR, t=4, m=k=8, l=8, and time sharing disabled". The total storage per warp for both the path and value history registers is 192-bits. In our benchmarks, the maximum number of confirmed spin-inducing branches was three. However, the maximum number of concurrent entries in the SIB-PTX was 9 entries (the next maximum was only four). A conservative 16-entry SIB-PT requires 560 bits of storage per SM.

DDOS integration with BOWS

Figure 23:
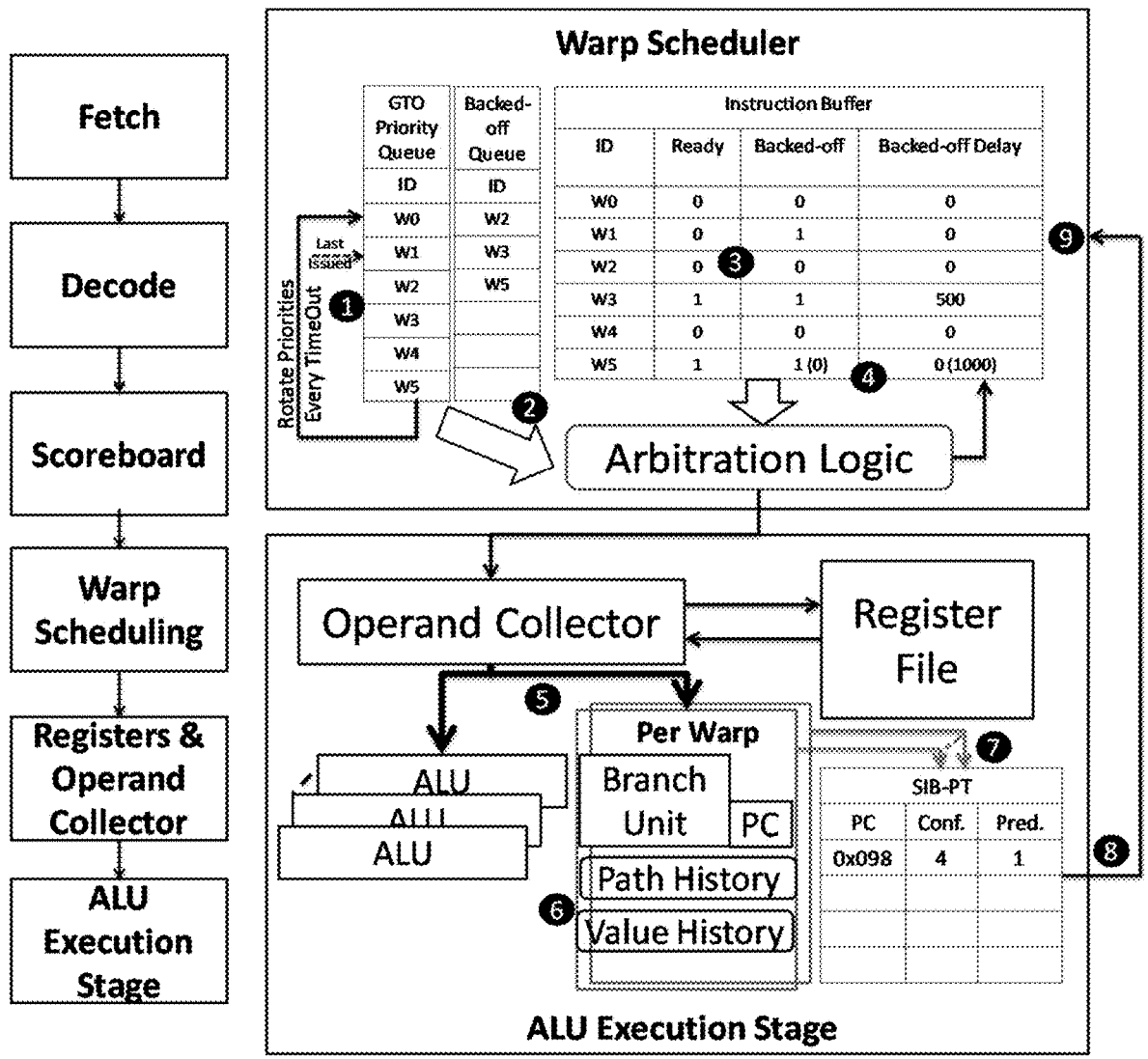
FIG. 23 illustrates the operation of BWOS integrated with DDOS.

FIG. 23 illustrates BOWS' combined with DDOS. Warp Scheduling: BOWS modifies the warp scheduling and execution stages. We found that strict GTO scheduling (without BOWS) can leads to livelocks on two of our benchmarks (HT and ATM). To avoid this, we modify GTO to rotate the age priority periodically (every 50,000 cycles in our evaluation). Arbitration logic first checks whether the last issued warp is ready to issue its next instruction ①. If the last issued warp is not ready, the oldest ready warp that is not backed-off is selected ②. If no such warp is available the backed-off queue is checked. A warp is added to backed-off queue after executing a SIB. A warp in the backed-off queue can be scheduled only if it is both ready and its back-off delay is zero ③. If the arbitration selects such a warp it is removed from the backed-off queue. The "Backed-off" field for the warp is set to false and the "Pending Back-off Delay" is initialized to the back-off delay limit value when the warp exits the backed-off state ④. A warp that has just executed a spin-inducing branch cannot be selected to issue its next instruction until its pending back-off delay is back to zero.

ALU Execution Stage: Path and value history are updated during execution of setp instructions ⑤, ⑥. Once the source operands of the instruction have been read from the register file, the ALU proceeds to compute the predicate value ⑤ and the operands of the first active threads are used to update the value history register ⑥. Note that current GPUs supports instructions such "shuffle" which allow threads within the same warp to access each other's registers. The underlying hardware can be used to select the source registers of the first active thread. If the warp executes a backward branch, then it looks up the SIB-PT ⑦. If the branch is predicted to be a spin-inducing branch ⑧ the warp enters the backed-off state ⑨ and is pushed to the end of the backed-off queue.

Evaluation

BOWS was implemented in GPGPU-Sim 3.2.2. GPGPU-Sim GTX480 was used for both GPGPU-Sim and GPUWattch for performance and energy evaluation. Below results for a Pascal GTX1080Ti configuration are reported that has a correlation of about 0.85 for Rodinia to estimate the impact of BOWS on the performance of newer generations of GPUs. We evaluate the impact of BOWS on three scheduling policies; GTO, LRR, and CAWA. For evaluation, we use Rodinia 1.0 for synchronization free benchmarks. The kernels described below have been utilized for displaying different synchronization patterns.

BH: BarnesHut is an N-body simulation algorithm. Its Tree Building (TB) kernel uses lock-based synchronization. The kernel is optimized to reduce contention by limiting the number of CTAs and using barriers to throttle warps before attempting a lock acquire. Its sort kernel (ST) uses a wait and signal synchronization scheme. We run BarnesHut on 30,000 bodies.

CP: Clothes Physics perform cloth physics simulation for a T-shirt. Its Distance Solver (DS) kernel lock-based implementation uses two nested locks to control updates to cloth particles.

HT: Chained HashTable uses the critical section shown in FIG. 2. We run 3.2M insertions by 40K threads on 1024 hashtable buckets.

ATM: A bank transfer between two accounts. It uses two nested locks. We run 122K transactions with 24K threads on 1000 accounts.

NW: Needleman-Wunsch finds the best alignment between protein or nucleotide sequences following a wavefront propagation computational pattern. We implemented a lock-based algorithm in which uses two kernels NW1 and NW2 that perform similar computation while traversing a grid into opposite directions.

TSP: Travelling Salesman. We modified a CUDA implementation to use a global lock when updating the optimal solution. We run TSP on 76 cities with 3000 climbers.

Simulation results show that BOWS consistently improves performance over different baseline scheduling policies with a speedup of 2.2 times, 1.4 times, and 1.5 times and energy savings of 2.3 times, 1.7 times and 1.6 times compared to LRR, GTO, and CAWA respectively (see A. ElTantawy and T. M. Aamodt, "BOWS: A Warp Scheduling Policy for Busy-Wait Synchronization in SIMT Architectures," *IEEE/ACM Symposium on High Performance Computing Architectures (HPCA)*, 2018 and A. ElTantawy, *Architectural Support for Inter-Thread Synchronization in SIMT Architectures*, PhD Dissertation, University of British Columbia, published Jul. 31, 2018, both of which are incorporated herein by reference.)

BOWS has minimal impact on TB because TB's code uses a barrier instruction to limit the number of concurrently executing warps between lock acquisition iterations. We note this barrier approach is fairly specific to TB. For example, it requires at least one thread from each warp to reach the barrier each iteration. Also, the lack of adaptivity of this software-based barrier approach can be harmful even where it can be applied (would lead to a 28×slowdown if applied to HT, measured on hardware—Pascal GTX1080). ST shows 17.8% energy improvements with BOWS as it reduces dynamic instruction count but does not exhibit performance improvement because the performance is limited by memory latency. In TSP, the synchronization instructions consume<0.03% of the total number of instructions, thus synchronization code is not the dominant factor in execution time. Large back-off delay values may unnecessarily block execution leading to performance.

For the NW kernels, the progress of younger warps is dependent on older warps finishing their execution. Therefore, NW prefers GTO scheduling over LRR as it gives priority to older warps. HT with the GTO scheduler runs into a pathological scheduling pattern where it prioritizes spinning warps which significantly reduce performance. BOWS eliminates such problems by deprioritizing spinning warps and consequently achieves good reduction of energy consumption.

Implementation Cost

The table below identifies the basic components in both DDOS and BOWS and estimates their costs per SM in certain embodiments of the inventions.

| DDOS | SIB-PT | 16-entry - 35 bits each (560 bits) |
|---|---|---|
|  | History Registers | 48 warps * 192 bits, (9216 bits) |
|  | Comparison | 8-bit comparator + 8:1 8-bitMux |
|  | Hashing (XOR) | 8 4-bit XORs |
|  | FSM | 48* 4-state FSM states |
| BOWS | Pending Delay Counters | 48* 14 (bits) = 672 bits |
|  | Backed-off Queue | 48 * 5 (bits) |
|  |  | Arbitration Logic Changes |
|  |  | Delay Limit Estimation Logic |
|  |  | (can use functional units when available) |

The main cost of DDOS is the history registers, but using time-sharing as discussed above it may be possible to reduce this cost. Comparison and hashing logic can be shared across warps in the same SM. To enable back-off delay up to 10,000 cycles requires 14-bits per Pending Delay counter. Adaptive estimation requires division. This can be done using reduced precision computation or by using existing arithmetic hardware when not in use.

Related Technology

Research papers have proposed different warp scheduling policies with different goals (e.g., improving latency hiding, improving locality, reducing barrier synchronization overheads, reducing load imbalance overhead across warps from the same CTA). However, none of these scheduling policies have considered the challenge of warp scheduling under inter-thread synchronization.

Overheads of fine-grained synchronization have been well studied in the context of multi-core CPU architectures. Also, Ti et al. proposed a thread spinning detection mechanism for multi-threaded CPUs that tracks changes in all registers. But applying such a technique to a GPU would be prohibitive given the large register files required to support thousands of hardware threads. Zhu proposes a synchronization state buffer that is attached to the memory controller of each memory bank to cache the state of in-flight locks. This reduces the traffic propagated to the main memory and the latency of synchronization operations. However, when the buffer is full the mechanism falls back to software synchronization mechanisms. That mechanism assumes that during parallel execution only a small fraction of memory locations are actively participating in synchronization, but this observation holds true only for modestly multi-threaded CPUs, it does not apply to massively multi-threaded SIMT architectures with tens of thousands of threads running in parallel.

Yilmazer and Kaeli propose hierarchal queuing at each block in L1 and L2 data caches with the use of explicit acquire/release primitives. Their goal is to implement a blocking synchronization mechanism on GPGPU. In that work, locks can be acquired only on a cache line granularity. Locked cache lines are not replaceable until released. If a cache set is full with locked lines, the mechanism reverts back to spinning for newer locks mapped to the same line. Thus, the efficiency of the mechanism drops as the number of locks increase and starts to perform worse than the baseline. For example, in the hashtable benchmark, the proposal performs worse than the baseline starting from 512 buckets (in contrast to embodiments of the present invention, which consistently outperform the baseline). Further, embodiments of the present invention does not assume explicit synchronization primitives which require non-trivial compiler support and/or significant hardware modifications to run correctly on SIMT architectures.

Transactional memory and lock-free synchronization are other approaches to implement inter-thread synchronization (see for example W. W. Fung, I. Singh, A. Brownsword, and T. M. Aamodt, "Hardware Transactional Memory for GPU Architectures," *IEEE/ACM Symposium on Microarchitecture (MICRO)*, pages 296-307, 2011; P. Misra and M. Chaudhuri, "Performance Evaluation of Concurrent Lock-free Data Structures on GPUs," *IEEE International Parallel and Distributed Processing Symposium (IPDPS)*, 2012; Y. Xu, R. Wang, N. Goswami, T. Li, L. Gao, and D. Qian, "Software Transactional Memory for GPU Architectures," *IEEE/ACM Symposium on Code Generation and Optimization (CGO)*, page 1, 2014). However, both techniques rely on retries upon failure which lead to overheads and contention that is similar to busy-wait synchronization. GPU transactional memory proposals to date achieve lower performance versus fine-grained synchronization. Similar results have been also reported for lock-free synchronization. Embodiments of the present invention employing DDOS and BOWS can be tuned to reduce commit failures in lock-free synchronization.

There are a large number of research papers that explore warp scheduling policies in GPGPUs. As an alternate warp scheduling policy to loose round-robin, Narasiman et al. proposed two-level warp scheduling where warps are divided into fixed size groups. Warps within each group are scheduled in a round-robin fashion, while different groups are scheduled in a greedy then oldest fashion. This scheduling policy aims to get the benefits of the round-robin policy in catching inter-warp locality and the greedy scheduling in forcing different groups to progress at different rates such that not all warps arrive at long latency operations at the same time.

Later, Rogers et al. proposed cache conscious warp scheduling that has opened the door for a series of adaptive warp scheduling policies. In that work the number of actively schedulable warps is adjusted according to the intra-warp lost data locality. A small victim cache is used to estimate the lost data locality metric. A follow-up work makes proactive warp scheduling decision based on predicted cache usage. That work makes the observation that intra-warp data locality is between instructions in consecutive iterations of a loop. Thus, it is possible to predict a warp cache footprint from the number of load instructions executed in a loop iteration and the divergence pattern of threads within the loop. The scheduling policy uses these predictions to schedule warps with aggregate predicted cache footprint that is less than the effective cache size.

Lee et al. observe a large execution time disparity between warps within the same thread block (see S.-Y. Lee and C.-J. Wu, "CAWS: criticality-aware warp scheduling for GPGPU workloads, *IEEE/ACM Conference on Parallel Architectures and Compilation Techniques (PACT)*, 2014). This leads to the underutilization of the GPGPU resources since the allocation granularity of resources inside a GPU shader is a thread block. The paper then proposes a set of heuristics to prioritize the scheduling of critical warps that prevent a thread block from terminating. Liu, Yang and Melhem tackle a similar problem and observe that warps in the same thread block may arrive to a thread-block wide barrier at different times leading to excessive stall cycles. They show that the distribution of warps in the same thread block over different physical warp scheduler complicates the problem. Thus, propose a dynamic warp scheduling policy where different warp schedulers coordinate to prioritize warps in threads blocks where some warps are already waiting at a barrier. The same problem is also addressed by in other work with the main distinction that the thread block with largest number of warps waiting at the barrier is prioritized as opposed to the thread block that first hit the barrier.

Various other warp scheduling policies have been proposed with different heuristics. For example, Yu at al. propose a two-level warp scheduling policy that dynamically adjust the warp groups size and moves warps from the active group to the pending group according to their pipeline stall pattern (see Y. Yu, W. Xiao, X. He, H. Guo, Y. Wang, and X. Chen, "A Stall-Aware Warp Scheduling For Dynamically Optimizing Thread-Level Parallelism In GPGPUs," ACM on International Conference on Supercomputing (ICS), 2015). Rogers et al. combine two techniques that attempt to balance the preservation of inter and intra thread locality (see T. G. Rogers, D. R. Johnson, M. O'Connor, and S. W. Keckler, "A Variable Warp Size Architecture," *IEEE/ACM Symposium on Computer Architecture (ISCA)*, 2015). Awatramani et al. use compiler analysis to detect which of a two-level warp scheduler or a GTO warp scheduler should be used for each phase of a kernel execution (see M. Awatramani, X. Zhu, J. Zambreno, and D. Rover, "Phase Aware Warp Scheduling: Mitigating Effects Of Phase Behavior In GPGPU Applications," *IEEE/ACM Conference on Parallel Architectures and Compilation Techniques (PACT)*, 2015). A similar approach is used by Lee et al. except that the switching between the two scheduling policies is detected at runtime according the instruction-issue pattern (see M. Lee, G. Kim, J. Kim, W. Seo, Y. Cho, and S. Ryu, "IPAWS: Instruction-Issue Pattern-Based Adaptive Warp Scheduling For GPGPUs," IEEE Symposium on High-Performance Computer Architecture (HPCA), 2016). Wang et al. use MSHR consumption as a heuristic to adjust the amount of thread level parallelism allowed by a warp scheduler (see B. Wang, Y. Zhu, and W. Yu, "OAWS: Memory Occlusion Aware Warp Scheduling," *IEEE/ACM Conference on Parallel Architectures and Compilation Techniques (PACT)*, 2016).

Nvidia's Volta GPGPU architecture supports "independent thread scheduling" to avoid thread synchronization deadlocks on earlier architectures and to enable interleaving the execution of divergent control flow paths (see for example "Inside Volta: The Worlds Most Advanced Data Center GPU", NVIDIA Corporation). Embodiments of the present invention can also be used with alternative SIMT implementations like the one in Volta where after branch divergence the scheduler can interleave warp "splits" from both sides of a branch before reconvergence.

Certain Nvidia GPGPUs also include a "NANOSLEEP" instruction (see for example U.S. Pat. No. 10,067,768 to Diamos et al.). Because NANOSLEEP operates on a per-thread basis, it creates divergence. Embodiments of the present invention are different in that the warp is deprioritized and its backed-off delay is set without being suspended. The backed-off delay only comes in effect to suspend the warp when it executes the spin-inducing branch again. This allows threads that succeeded to acquire the lock to proceed. BOWS is dynamic, done by hardware, can use runtime metrics to determine the back-off delay value (which would be different depending on how many warps are contending for the lock). The NANOSLEEP instruction has to be inserted by programmers and it will be fixed for specific delay. BOWS works on all SIMT architectures, especially in the case of fine grained synchronization. For example, what if some threads within a warp acquired the lock while others did not. In BOWS, the back-off delay will overlap the critical section execution by threads that acquired the lock.

Conclusions

The convenience of the SIMT programming model has encouraged programmers to use it in accelerating irregular data parallel computations achieving in many cases significant speedups and energy savings over CPU multi-threaded implementations. Compared to other energy efficient alternatives such as ASIC and FPGAs, SIMT architectures have a programmability advantage that enables workload consolidation. However, current SIMT implementations lack reliable and efficient support for inter-thread synchronization that is essential for efficient implementations of many irregular applications.

This challenge has been facing both general purpose programmers (e.g., in CUDA and OpenCL) and graphics programmers (e.g., in GLSL and HLSL). That being said, existing GPU applications that worked around current SIMT limitations to implement algorithms with fine-grained synchronization have achieved significant improvement over CPU implementations. However, they are vulnerable to portability and compatibility issues across compilers and/or GPU architectures. Further, such individual workarounds do not provide general rules that could ease the adoption of other algorithms with different inter-thread synchronization patterns. Their positive performance results, however, encouraged us to explore reliable and more efficient support of fine-grained synchronization in the SIMT execution model.

Another motivation is the wide interest in high level programming languages for accelerators such as OpenMP 4.0. The abstraction and portability of the OpenMP programming model will help SIMT accelerators reach a broader range of developers. However, support of fine-grained synchronization in OpenMP relies on runtime library calls that is challenging to properly implement on current SIMT implementations. This would equally apply to any future CUDA or OpenCL API extensions that could be proposed to abstract fine-grained synchronization.

Embodiments of the present invention solve the problem of improving the efficiency of fine-grain synchronization on SIMT architectures with a low cost mechanism. The main source of inefficiency in inter-thread synchronization on SIMT hardware is the warp scheduling policy that is oblivious to such synchronization. Embodiments of the present invention employ a low cost mechanism to dynamically detect the presence of synchronization and accordingly tune the warp scheduling policy. We showed that this mechanism, though simple, provides significant performance and energy improvements for applications with inter-thread synchronization. BOWS shows that a low cost and simple extension to the warp scheduling policy can significantly improve the performance of applications with inter-thread synchronization. Thus, in certain embodiments it could be integrated with current warp scheduling policies to accelerate the ongoing improvement in thread synchronization in GPGPUs.

SIMT Synchronization APIs

The support of high level synchronization APIs on SIMT architectures seems inevitable with the current interest in high level programming models. BOWS and DDOS react to the run-time detection mechanism of spinning loops. With explicit synchronization APIs, the compiler can add annotations that helps BOWS and DDOS to proactively adjust the warp scheduling policy.

Runtime Livelock Detection

Dynamic Detection of Spinning (DDOS) can be further extended to detect the presence of livelocks in parallel kernels. It can be used as an initial light weight mechanism that monitors the overall progress of warps in the system. If DDOS indicates that all warps have been spinning for a long period of time, a heavy weight mechanism that checks the full system state can be triggered to confirm.

One potential challenge is that DDOS is designed to detect spinning in short loops as is the case with busy-wait loops. This helped to reduce its value and path history register length. However, livelock can appear due to complex scenarios that involve larger, consecutive and/or nested loops. To address longer loops, longer history registers can be used with time sharing enabled to reduce costs. To address consecutive and nested loops, different history registers need to be allocated for each loop.

The present invention has been described above in connection with several preferred embodiments. This has been done for purposes of illustration only, and variations of the inventions will be apparent to those skilled in the art and also fall within the scope of the invention.

The invention claimed is:

1. A method that detects a spin-inducing branch in a single-instruction multithreaded system comprising:
    initializing a profiled thread from among a group of threads executing a common single instruction stream as being in a non-spinning state;
    determining a repeated execution of a first instruction by said profiled thread;
    comparing operand values across a plurality of executions of said first instruction by said profiled thread;
    marking the profiled thread as being in a spinning state, based on said step of comparing, when said operand values do not change across a predetermined number of executions;
    marking the profiled thread as being in the non-spinning state, based on said step of comparing, when said operand values change between successive executions;
    detecting that the profiled thread has executed a first branch in the backward direction during a first time period and conditionally labeling the first branch as a spin-inducing branch, comprising the sub-steps of:
        initializing a confidence level of said first branch to a first predetermined value when said first branch is first executed when the profiled thread is in the spinning state;
        increasing the confidence level each time the profiled thread executes the first branch in a backward direction when the profiled thread is in the spinning state;
        decreasing the confidence level each time the profiled thread executes the first branch in a backward direction when the profiled thread is in the non-spinning state and;
        labeling the first branch as a spin-inducing branch when the confidence level exceeds a confidence threshold.

2. A method that detects a spin-inducing branch in a single-instruction multithreaded system comprising:
    initializing a profiled thread from among a group of threads executing a common single instruction stream as being in a non-spinning state;
    determining a repeated execution of a first instruction by said profiled thread;
    comparing operand values across a plurality of executions of said first instruction by said profiled thread;
    marking the profiled thread as being in a spinning state, based on said step of comparing, when said operand values do not change across a predetermined number of executions that is fixed for a specific execution of said common single instruction stream;
    marking the profiled thread as being in the non-spinning state, based on said step of comparing, when said operand values change between successive executions;
    detecting that the profiled thread has executed a first branch in the backward direction during a first time period and conditionally labeling the first branch as a spin-inducing branch.

3. A method that detects a spin-inducing branch in a single-instruction multithreaded system comprising:
    initializing a profiled thread from among a group of threads executing a common single instruction stream as being in a non-spinning state;
    determining a repeated execution of a first instruction by said profiled thread;
    comparing operand values across a plurality of executions of said first instruction by said profiled thread;
    marking the profiled thread as being in a spinning state, based on said step of comparing, when said operand values do not change across a predetermined number of executions that is dynamically adjusted based on an adaptive hardware mechanism that monitors spin overhead;
    marking the profiled thread as being in the non-spinning state, based on said step of comparing, when said operand values change between successive executions;
    detecting that the profiled thread has executed a first branch in the backward direction during a first time period and conditionally labeling the first branch as a spin-inducing branch.

4. The method of claim 1 wherein said confidence threshold is fixed for a specific execution of said common single instruction stream.

5. The method of claim 1 wherein said confidence threshold is dynamically adjusted based on an adaptive hardware mechanism that monitors spin overhead.

6. A method that detects a spin-inducing branch in a single-instruction multithreaded system comprising:
    initializing a profiled thread from among a group of threads executing a common single instruction stream as being in a non-spinning state;

determining a repeated execution of a first instruction by said profiled thread utilizing a path history register configured to track the identity of a plurality of the most recent comparison instructions executed by the profiled thread;

comparing operand values across a plurality of executions of said first instruction by said profiled thread;

marking the profiled thread as being in a spinning state, based on said step of comparing, when said operand values do not change across a predetermined number of executions;

marking the profiled thread as being in the non-spinning state, based on said step of comparing, when said operand values change between successive executions;

detecting that the profiled thread has executed a first branch in the backward direction during a first time period and conditionally labeling the first branch as a spin-inducing branch.

7. A method that detects a spin-inducing branch in a single-instruction multithreaded system comprising:

initializing a profiled thread from among a group of threads executing a common single instruction stream as being in a non-spinning state;

determining a repeated execution of a first instruction by said profiled thread;

comparing operand values across a plurality of executions of said first instruction by said profiled thread utilizing a value history register configured to track the source operand values used by a plurality of comparison instructions executed by the profiled thread;

marking the profiled thread as being in a spinning state, based on said step of comparing, when said operand values do not change across a predetermined number of executions;

marking the profiled thread as being in the non-spinning state, based on said step of comparing, when said operand values change between successive executions;

detecting that the profiled thread has executed a first branch in the backward direction during a first time period and conditionally labeling the first branch as a spin-inducing branch.

8. A method that detects a spin-inducing branch in a single-instruction multithreaded system comprising:

initializing a profiled thread from among a group of threads executing a common single instruction stream as being in a non-spinning state;

determining a repeated execution of a first instruction by said profiled thread;

comparing operand values across a plurality of executions of said first instruction by said profiled thread;

marking the profiled thread as being in a spinning state, based on said step of comparing, when said operand values do not change across a predetermined number of executions;

marking the profiled thread as being in the non-spinning state, based on said step of comparing, when said operand values change between successive executions;

detecting that the profiled thread has executed a first branch in the backward direction during a first time period and conditionally labeling the first branch as a spin-inducing branch utilizing a spin-inducing branch prediction table configured to record the identity of a plurality of branches.

9. A method that detects a spin-inducing branch in a single-instruction multithreaded system comprising:

initializing a profiled thread from among a group of threads executing a common single instruction stream as being in a non-spinning state;

determining a repeated execution of a first instruction by said profiled thread;

comparing operand values across a plurality of executions of said first instruction by said profiled thread;

marking the profiled thread as being in a spinning state, based on said step of comparing, when said operand values do not change across a predetermined number of executions;

marking the profiled thread as being in the non-spinning state, based on said step of comparing, when said operand values change between successive executions;

detecting that the profiled thread has executed a first branch in the backward direction during a first time period and conditionally labeling the first branch as a spin-inducing branch;

initializing said group of threads as being in a not backed-off state;

detecting execution of a branch that has been labeled as a spin-inducing branch by said group of threads, and when said branch is executed marking said group of threads as being in a backed-off state and lowering a scheduling priority of said group of threads.

10. The method of claim 9 further comprising:

detecting a scheduling of said group of threads, and when said group of threads are scheduled for execution, initializing a back-off counter to an initial back-off value;

decrementing said back-off counter when not zero based on a predetermined number of clock cycles; and detecting another execution of said branch by said group of threads, and when said branch is executed, preventing the scheduling of said group of threads until said back-off counter is zero.

11. The method of claim 10 wherein said initial back-off value is dynamically adjusted based on an adaptive hardware mechanism that monitors spin overhead.

12. A system that detects a spin-inducing branch in a single-instruction multithreaded system, comprising:

a path history register that tracks the identity of a plurality of comparison instructions executed by a profiled thread and wherein said path history register detects a repeated execution of a first instruction by the profiled thread;

a value history register that tracks the source operand values used by a plurality of comparison instructions executed by the profiled thread, wherein said value history register compares operand values across a plurality of executions of a first instruction and marks the profiled thread as being in a spinning state when said operand values do not change across a predetermined number of executions and marks the profiled thread as being in a non-spinning state when said operand values change between successive executions; and a spin-inducing branch prediction table that records the identity of a plurality of branches, wherein said spin-inducing branch prediction table detects that the profiled thread has executed a first branch in the backward direction and conditionally labels the first branch as a spin-inducing branch, wherein said spin-inducing branch prediction initializes a confidence level of said first branch to a first predetermined value when said first branch is first executed when said profiled thread is in the spinning state and increases the confidence level each time the profiled thread executes the first branch in a backward direction when said profiled thread is in the spinning state and decreases the confidence level each time the profiled thread executes the first branch in a backward direction when the profiled thread is in the non-spinning state, and labels the first branch as a spin-inducing branch when the confidence level exceeds a confidence threshold.

13. A system that detects a spin-inducing branch in a single-instruction multithreaded system, comprising:
a path history register that tracks the identity of a plurality of comparison instructions executed by a profiled thread and wherein said path history register detects a repeated execution of a first instruction by the profiled thread;
a value history register that tracks the source operand values used by a plurality of comparison instructions executed by the profiled thread, wherein said value history register compares operand values across a plurality of executions of a first instruction and marks the profiled thread as being in a spinning state when said operand values do not change across a predetermined number of executions that is fixed for a specific execution of said common single instruction stream and marks the profiled thread as being in a non-spinning state when said operand values change between successive executions; and
a spin-inducing branch prediction table that records the identity of a plurality of branches, wherein said spin-inducing branch prediction table detects that the profiled thread has executed a first branch in the backward direction and conditionally labels the first branch as a spin-inducing branch.

14. A system that detects a spin-inducing branch in a single-instruction multithreaded system, comprising:
a path history register that tracks the identity of a plurality of comparison instructions executed by a profiled thread and wherein said path history register detects a repeated execution of a first instruction by the profiled thread;
a value history register that tracks the source operand values used by a plurality of comparison instructions executed by the profiled thread, wherein said value history register compares operand values across a plurality of executions of a first instruction and marks the profiled thread as being in a spinning state when said operand values do not change across a predetermined number of executions that is dynamically adjusted based on an adaptive hardware mechanism that monitors spin overhead and marks the profiled thread as being in a non-spinning state when said operand values change between successive executions; and
a spin-inducing branch prediction table that records the identity of a plurality of branches, wherein said spin-inducing branch prediction table detects that the profiled thread has executed a first branch in the backward direction and conditionally labels the first branch as a spin-inducing branch.

15. The system of claim 12 wherein said confidence threshold is dynamically adjusted based on an adaptive hardware mechanism that monitors spin overhead.

16. A system that detects a spin-inducing branch in a single-instruction multithreaded system, comprising:
a path history register that tracks the identity of a plurality of comparison instructions executed by a profiled thread and wherein said path history register detects a repeated execution of a first instruction by the profiled thread;
a value history register that tracks the source operand values used by a plurality of comparison instructions executed by the profiled thread, wherein said value history register compares operand values across a plurality of executions of a first instruction and marks the profiled thread as being in a spinning state when said operand values do not change across a predetermined number of executions and marks the profiled thread as being in a non-spinning state when said operand values change between successive executions; and
a spin-inducing branch prediction table that records the identity of a plurality of branches, wherein said spin-inducing branch prediction table detects that the profiled thread has executed a first branch in the backward direction and conditionally labels the first branch as a spin-inducing branch;
a scheduler that schedules a plurality of groups of threads according to a scheduling priority and wherein each of said plurality of groups of threads can be configured to be in a backed-off state or a not-backed-off state and wherein said scheduler lowers the scheduling priority of groups of threads in the backed-off state;
wherein when a first group of threads executes an instruction that has been labeled as a spin-inducing branch, said first group of threads is configured to be in the backed-off state.

17. The system of claim 16 further comprising:
a back-off counter associated with said first group of threads;
a decrementer that decrements said back-off counter when not zero based on a predetermined number of clock cycles;
wherein when said first group of threads is scheduled for execution, said scheduler initializes the back-off counter to an initial back-off value, and wherein if said back-off counter is not zero when said spin-inducing branch is executed again, the scheduler prevents scheduling of said first group of threads until said back-off counter is zero.

18. The method of claim 17 wherein said initial back-off value is dynamically adjusted based on an adaptive hardware mechanism that monitors spin overhead.

* * * * *